US012782173B2

(12) United States Patent
(10) Patent No.: US 12,782,173 B2
(45) Date of Patent: Nov. 3, 2026

Tessema et al.

(54) SENSOR-EMBEDDED COMPOSITES

(71) Applicant: TPI, Inc., Warren, RI (US)

(72) Inventors: Addis Tessema, East Providence, RI (US); John Perraut, Somerset, MA (US); McKevin Veloso, Lincoln, RI (US); Paul Roehm, Wyoming, MI (US); Jonathan M. Cabot, Warren, RI (US); Michael Lerman, Providence, RI (US); Scott Larson, Somerset, MA (US); Satya Immani, Cranston, RI (US)

(73) Assignee: TPI, Inc., Warren, RI (US)

( * ) Notice: Subject to any disclaimer, the term of this patent is extended or adjusted under 35 U.S.C. 154(b) by 437 days.

(21) Appl. No.: 18/316,882

(22) Filed: May 12, 2023

(65) Prior Publication Data

US 2023/0366707 A1 Nov. 16, 2023

Related U.S. Application Data

(60) Provisional application No. 63/341,468, filed on May 13, 2022, provisional application No. 63/341,552, (Continued)

(51) Int. Cl.
*G01D 21/00* (2006.01)
*B29C 70/52* (2006.01)
*B29C 70/70* (2006.01)

(52) U.S. Cl.
CPC ........... *G01D 21/00* (2013.01); *B29C 70/521* (2013.01); *B29C 70/70* (2013.01)

(58) Field of Classification Search
CPC ..... B29C 70/521; B29C 70/70; B29C 70/865; B29C 70/885; G01D 21/00
See application file for complete search history.

(56) References Cited

U.S. PATENT DOCUMENTS

| | | | | |
|---|---|---|---|---|
| 11,011,722 B1 * | 5/2021 | Howard | C09K 11/02 |
| 2007/0095160 A1 * | 5/2007 | Georgeson | G01N 29/0645 73/866 |

(Continued)

FOREIGN PATENT DOCUMENTS

| | | | |
|---|---|---|---|
| CN | 202495075 U | * 10/2012 |
| CN | 101535039 B | 10/2013 |

(Continued)

OTHER PUBLICATIONS

Invitation to Pay Additional Fees for Application No. PCT/US2023/022065 dated Jul. 3, 2023.

(Continued)

*Primary Examiner* — Kristina M Deherrera
*Assistant Examiner* — Gedeon M Kidanu
(74) *Attorney, Agent, or Firm* — Stephen J. Kenny; Nicole P. Bustos-Pomerantz; Foley Hoag LLP

(57) ABSTRACT

A system for structural health monitoring of a panel includes a panel of a composite laminate structure. The system further includes a plurality of sensors disposed on at least a surface of the panel each configured to measure at least an electrical datum associated with a portion of the panel. The system further includes a data acquisition system electrically coupled to the plurality of sensors and configured to receive the at least an electrical datum. The system further includes an alert system electrically coupled to at least the data acquisition system and configured to alert a user based on the at least an electrical datum.

11 Claims, 30 Drawing Sheets

Related U.S. Application Data filed on May 13, 2022, provisional application No. 63/341,561, filed on May 13, 2022, provisional application No. 63/341,682, filed on May 13, 2022, provisional application No. 63/341,708, filed on May 13, 2022, provisional application No. 63/341,814, filed on May 13, 2022.

(56) References Cited

U.S. PATENT DOCUMENTS

| | | | | |
|---|---|---|---|---|
| 2009/0216398 | A1 | 8/2009 | Lynch et al. | |
| 2013/0021138 | A1 | 1/2013 | Ezzat et al. | |
| 2014/0251480 | A1* | 9/2014 | Kulkarni | B29C 63/34 29/700 |
| 2015/0185128 | A1 | 7/2015 | Chang et al. | |
| 2017/0168021 | A1* | 6/2017 | Van Tooren | B64F 5/60 |
| 2021/0308961 | A1* | 10/2021 | Zhao | H05K 3/4664 |
| 2023/0366707 | A1 | 11/2023 | Tessema et al. | |

FOREIGN PATENT DOCUMENTS

| | | | | |
|---|---|---|---|---|
| EP | 3750697 | A1 | 12/2020 | |
| WO | WO-2020249240 | A1 * | 12/2020 | G06K 19/07786 |
| WO | WO-2023/220385 | A1 | 11/2023 | |

OTHER PUBLICATIONS

International Search Report and Written Opinion for International Application No. PCT/US23/22065 dated Sep. 27, 2023.
Supplementary Patial European Search Report for EP Application No. 23804326.9 dated Mar. 9, 2026.

* cited by examiner

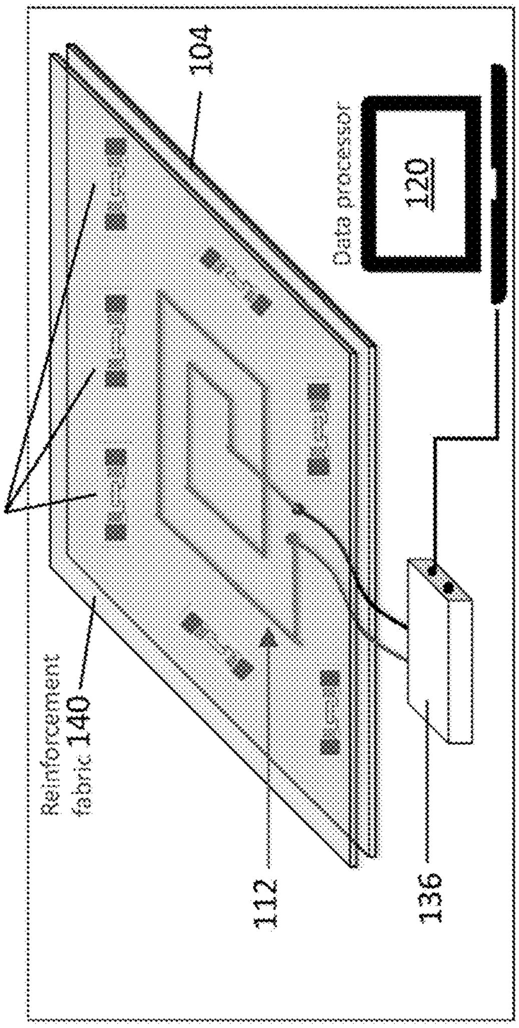
FIG. 5A
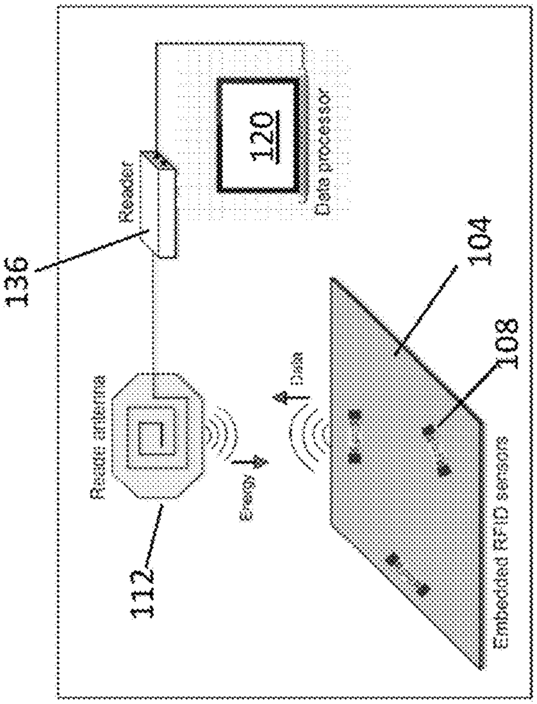

Electrically conductive lines tracing and joint connection coating

SENSOR-EMBEDDED COMPOSITES

CROSS-REFERENCE TO RELATED APPLICATIONS

This application claims the benefit of priority under 35 USC 119 to U.S. Provisional Application Nos. 63/341,468, titled, "SYSTEM AND METHOD FOR PULTRUSION EMBEDDED SENSORS" filed on May 13, 2022, 63/341,552, titled, "SYSTEM AND METHOD FOR ELECTROLUMINESCENT COATING" filed on May 13, 2022, 63/341,561, titled, "SYSTEM AND METHOD FOR FABRICATION OF ELECTRICAL CIRCUITS AND CONDUCTIVE CONTACT SURFACES" filed on May 13, 2022, 63/341,682, titled, "SYSTEM AND METHOD FOR STRUCTURAL HEALTH MONITORING" filed on May 13, 2022, 63/341,708, titled, "DAMAGE AND MOISTURE DETECTION USING RADIO FREQUENCY BASED SYSTEM" filed on May 13, 2022, 63/341,814, title, "SYSTEM AND METHOD FOR STRUCTURAL HEALTH MONITORING AND AUTOMATED REPAIR" filed on May 13, 2022. The entire contents of each of these applications is hereby incorporated by reference herein.

BACKGROUND OF THE DISCLOSED SUBJECT MATTER

Field of the Disclosed Subject Matter

The disclosed subject matter relates to a system for sensor-embedded composites. Particularly, the present disclosed subject matter is directed to structural health monitoring techniques to assess and spot high deformation, dents and/or cracks on various mechanical parts via sensor-embedded composites. The present disclosure can be incorporated into a variety of composite products, including vehicles (automotive, marine, etc.), wind turbine structures (e.g. blades, towers, nacelles), and general structural components employed in building construction (e.g. walls, panels, etc.).

DESCRIPTION OF RELATED ART

Conventional methods for assessing damage to structures are time intensive, often suffer from human error (e.g. manual inspection and repair), and must be tailored/adjusted depending on the component to be monitored/repaired.

There thus remains a need for an efficient and economic method and system for structural health (e.g. moisture, damage, crack propagation, etc.) monitoring as described herein. It is important for critical material components to have a simple, efficient on-surface or embedded damage detection systems to spot higher deformation, dent or cracks due to impact hit or other damage.

The present disclosure provides a system and method for embedding sensors in a pultrusion to measure phenomena related to the manufacturing process, and/or the conditions the product may be subject to in the field. Also, the present disclosure provides a method of fabricating integrated electric circuits and conductive contact surfaces in composite products which is beneficial over cost prohibitive ultrasonic-based internal damage detection systems.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purposes of the disclosed subject matter, as embodied and broadly described, the disclosed subject matter includes a system for structural health monitoring, the system including a composite structural panel, at least one sensor embedded within the composite structural panel, the at least one sensor configured to measure a parameter associated with composite structural panel, an antenna in electrical communication with the at least one sensor, the antenna configured to transmit data associated with the parameter, and a reader communicatively connected to the at least one sensor, the reader configured to receive the data.

In some embodiments, the system further includes a processor, the processor communicatively connected to the reader and the processor configured to generate an action command corresponding to the data.

In some embodiments, the system further includes an electroluminescent panel communicatively connected to at least the processor.

In some embodiments, the at least one sensor is an RFID sensor.

In some embodiments, the at least one sensor is wireless.

In some embodiments, the at least one sensor is embedded within the composite structural panel via a pultrusion process.

In some embodiments, the antenna is formed from conductive traces printed on the composite structural panel.

In some embodiments, the system further includes a flexible circuit, the flexible circuit having electrically conductive traces disposed on a substrate, the substrate having a plurality of perforations formed therethrough.

In some embodiments, the system includes at least one actuator switch, the at least one actuator switch communicatively connected to the processor.

In some embodiments, the composite structural panel has an upper surface and a bottom surface defining a thickness therebetween, with the sensor disposed within the composite panel at a location spaced from the upper and lower surfaces.

In some embodiments, the system further includes a plurality of sensors configured to measure a parameter and generate a datum corresponding to the parameter, a data acquisition system communicatively coupled to the plurality of RFID sensors and configured to receive the datum; and an alert system electrically coupled to at least the data acquisition system and configured to generate an alert signal based on the datum.

To achieve these and other advantages and in accordance with the purposes of the disclosed subject matter, as embodied and broadly described, the disclosed subject matter includes a method for pultruding a composite panel with embedded sensors, the method including unspooling a fabric from a fabric spool, the fabric comprising at least one sensor disposed within its strands, unspooling a sensor filament alongside the fiber, pulling the fabric and the sensor filament through a resin container, pulling the resin-soaked fabric and sensor filament through a die, wherein the die imparts a cross sectional shape and applying heat to the fabric and the sensor filament.

In some embodiments, the fabric comprises a sensor at regular intervals along its unspooled length.

In some embodiments, the at least one sensor comprises a temperature sensor.

In some embodiments, the at least one sensor is continuously pulled alongside the fiber.

In some embodiments, the at least one sensor comprises a plurality of sensors disposed through layers of the fiber.

To achieve these and other advantages and in accordance with the purposes of the disclosed subject matter, as embodied and broadly described, the disclosed subject matter includes a composite panel with an electroluminescent coating, including a transparent conductive layer configured to absorb ultraviolet light comprising Indium oxide material, an electroluminescent coat disposed below the transparent conductive layer, the electroluminescent coat comprising a phosphorous-based electrochromatic coating configured to glow when an electric current is applied, a substrate dielectric insulation disposed below the electroluminescent coat, and a conductive backplane disposed below the substrate dielectric insulation.

In some embodiments, the conductive backplane layer comprises carbon fiber laminate.

In some embodiments, the substrate dielectric insulation comprises fiber glass laminate.

In some embodiments, the electric current applied is controlled by a user.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 5A-C are schematic representations of flexible circuits in accordance with the disclosed subject matter.

DETAILED DESCRIPTION OF AN EXEMPLARY EMBODIMENT

Figure 1:
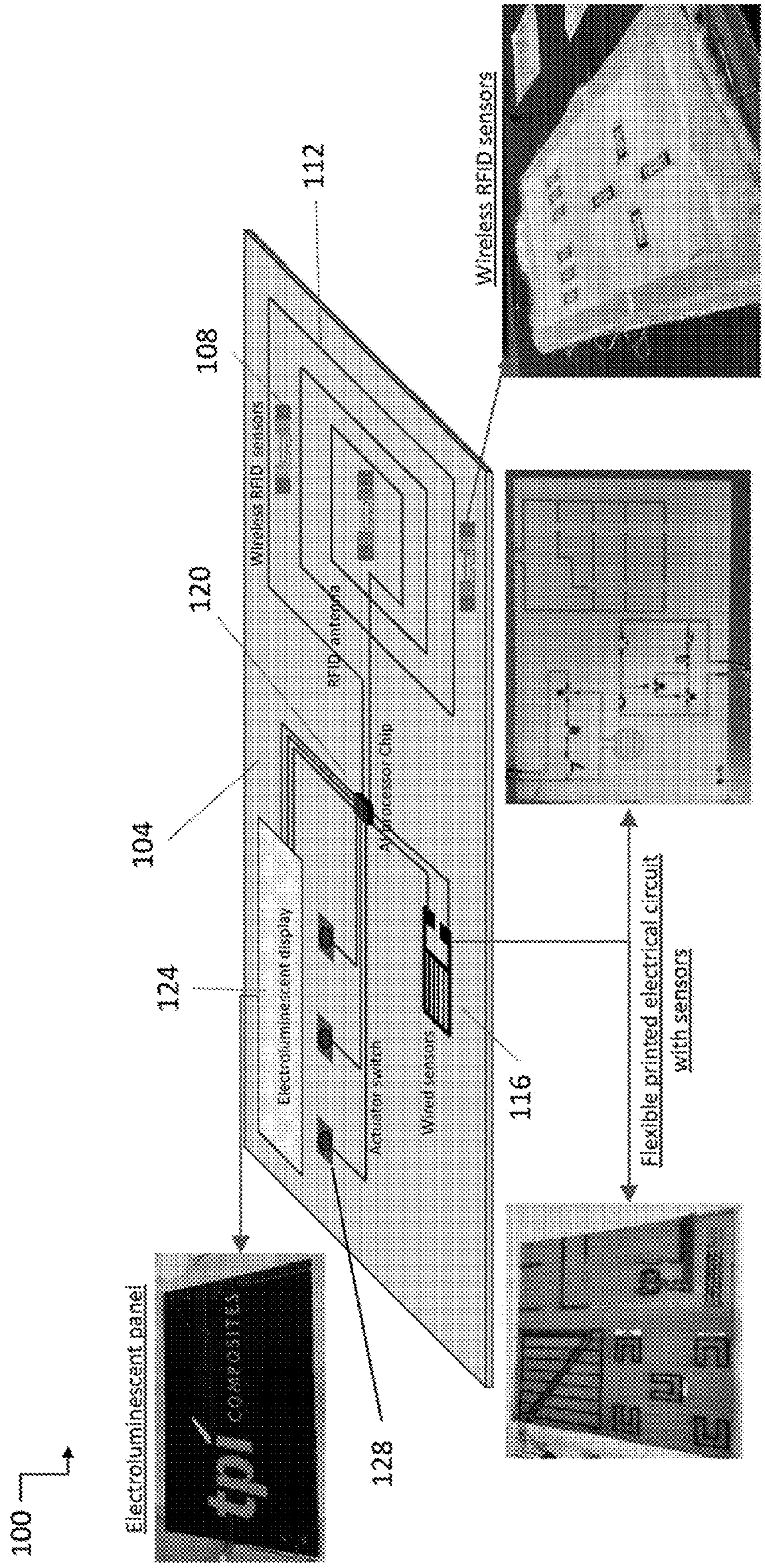
FIG. 1 is a schematic representation of a system for sensor-embedded composites in accordance with the disclosed subject matter.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for structural health monitoring of composite parts. The disclosed subject matter is particularly suited for structural health monitoring techniques to assess higher deformation areas of mechanical parts. For purpose of explanation and illustration, and not limitation, exemplary embodiments of the system in accordance with the disclosed subject matter is shown in the figures, e.g. FIG. 8 designated generally by reference character 800. Similar reference numerals (differentiated by the leading numeral) may be provided among the various views and Figures presented herein to denote functionally corresponding, but not necessarily identical structures.

Sensor-Embedded Composites

As shown in FIG. 1, a system 100 for sensor-embedded composites is shown in schematic view. Composite laminate structure 104 may be a panel of a composite laminate structure or a portion of a panel of a composite laminate structure. The composite material can include glass, carbon, aramid, etc. fibers, and the composite laminate structure may be a portion of a vehicle such as an electric vehicle, air vehicle, conventional vehicle, structural integrated panel (SIP), portion of a building or a like structural element. The composite laminate structure 104 may include one or more panels coupled together to form a skin, shell, body, or other structural or ornamental shape associated with a vehicle such as an electric vehicle. Furthermore, the contents of the present disclosure can be incorporated to any composite material (e.g. building and general construction walls/panels, etc.)

The composite laminate structure 104 may include a skid plate such as one used in an electric vehicle disposed on the bottom of the vehicle. System 100 may be configured to monitor material state of damage continuously, periodically, or at predetermined instances while one or parts, such as the panel, is on service, in the field, installed on the vehicle, or the like. System 100 may be configured to monitor one or more environmental parameter, performance characteristic, or the like associated with the composite structural panel 104. In accordance with an aspect of the present disclosure, numerous electrical components for sensing/diagnosing the structural health and integrity of the composite part are disclosed (e.g. sensors, antenna, power source, etc.) and each can be incorporated into a desired location (or depth) of the composite product. In some embodiments, all electrical components are located at the same depth, or in-plane with each other, within the composite product.

System 100 includes at least one radiofrequency identification (RFID) sensor 108. RFID sensor 108 may be embedded within the composite structural panel 104 during the manufacturing process of the panel. Additionally or alternatively, RFID sensor 108 may be embedded with in the composite structural panel 104 after the manufacturing process, for example by being inserted into an opening, cut or slit in the panel. In various embodiments, as described herein below, RFID sensor 108 may be embedded within the composite structural panel 104 during a resin infusion process such as vacuum-assisted-resin-transfer-molding (VARTM) processes. In various embodiments, RFID sensor 108 may be wired or wireless. In various embodiments, a first portion of RFID sensor 108 may be electrically connected to one or more sensors, antennae or other electrical components that will be described herein. In various embodiments, each RFID sensor 108 may be electrically isolated, connected to a unique power source, antenna, processor, or another electrical component. Additionally or alternatively, passive RFID sensors can be employed which are powered when interrogated by an RFID reader.

RFID sensors 108 may have incorporated internal/external sensors that may provide an advantage in creating wireless sensing technologies. RFID sensors 108 may be configured to be disposed at any point within the composite structural panel, at any interval, whether arranged randomly or in grids, rows, columns, at joints, or at sensitive or high stress locations on the composite structural panel 104. For example and without limitation, there may be a plurality RFID sensors 108 located at certain locations on the composite structural panel 104, n various locations on the composite structural panel 104, or spread throughout the composite structural panel 104 to increase the resolution of information measured or detected by the plurality of RFID sensors 108.

In various embodiments, as will be further described below, RFID sensors 108 may be embedded in the composite structural panel 104 during or after the manufacturing process. In various embodiments, RFID sensors 108 may be embedded on the surface of the composite structural panel disposed externally to the lamina of the panel (although this configuration allows for sealing or other liquid or vapor applications to the exterior of the panel). In various embodiments, RFID sensor 108 may be configured to be applied to the composite structural panel 104 as an applique. In various embodiments, the applique may be a sticker, wherein the RFID sensor 108 or the panel has or is applied with an adhesive. In such embodiments, the sensor can be flexible allowing for incorporation into/onto a non-linear structure/lamina (e.g. a curved composite component having a radius of curvature where the sensor 108 is applied). In various embodiments, the RFID sensor 108 may be applied to the composite structural panel 104 with one or more mechanical fasteners. For example and without limitation the RFID sensor 108 may include one more cavities or openings configured to receive a nail, screw, dowel, peg or pin.

Figure 3:
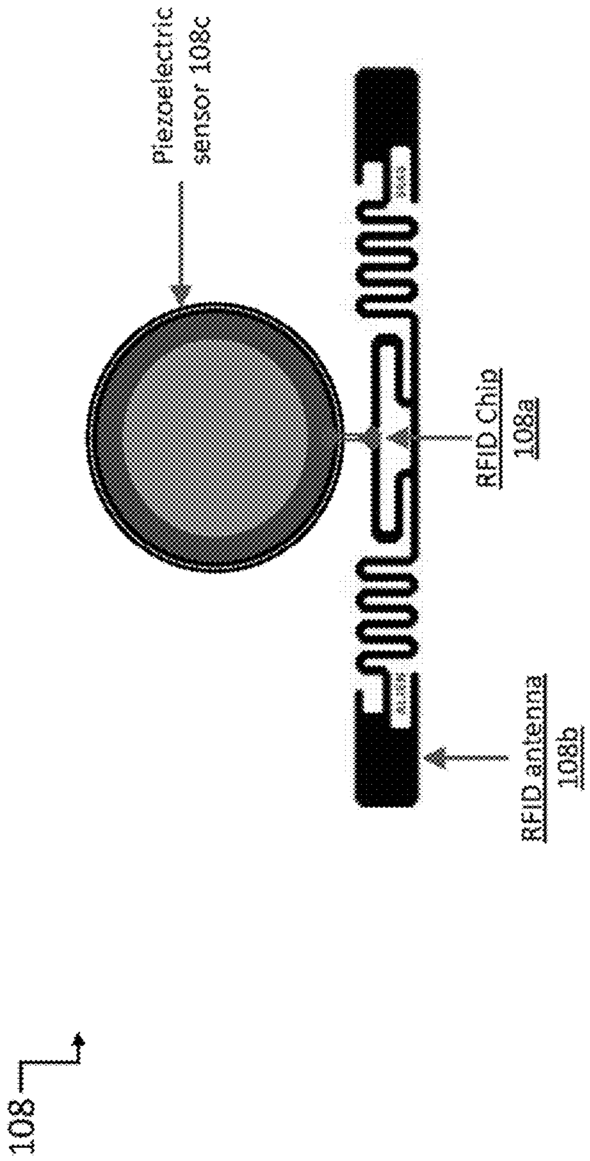
FIG. 3 is a schematic representation of a piezoelectric sensor in accordance with the disclosed subject matter.

As shown in FIG. 3, RFID sensor 108 may include a RFID chip **108*a*. RFID sensor 108 may include a RFID antenna 108*b*. In various embodiments, RFID sensor 108 may include piezoelectric (PZT) sensor 108*c*. In various embodiments, PZT sensor 108*c* is attached to RFID chip circuitry (RFID chip 108*a* and RFID antenna 108*b*). In various embodiments, PZT sensor 108*c* may generate electricity when subjected to a change in temperature or deformation. For example and without limitation, PZT sensor 108*c* may generate electricity when subjected to vibrations, which impart force and thus deform the piezoelectric sensor 108*c*. The electricity generated by the PZT 108*c* may provide power to the RFID sensor 108 to both operate as a sensor and measure a physical, environmental or physical phenomena and transmit the data to one or more other sensors, antennae, readers or processors. RFID sensor 108 may be wireless such that all data transmission is performed over radiofrequency or other electromagnetic radiation. In various embodiments, the PZT sensor 108*c* may be configured to generate electricity to power on and provide location data to the reader 136, for example, the location of that RFID sensor 108 within the composite structural panel 104, the vehicle or the building. In various embodiments, PZT sensor 108*c* communicatively connected to RFID sensor 108 may generate electrical energy based on change in temperature or shape, and transmit that electrical energy to one or more other RFID sensors 108 in order to power those sensors. In various embodiments, a subset of the RFID sensors 108, each having a PZT sensor 108*c*, may be configured to generate and transmit electrical energy to another subset of RFID sensors 108 that do not have PZT sensor 108*c* attached thereto. In various embodiments, a subset of the RFID sensors 108, each having a PZT sensor 108*c*, may be configured to generate and transmit electrical energy to another subset of RFID sensors 108** that have a PZT sensor 108*c* attached thereto. For example and without limitation, PZT sensors 108*c* may be configured to provide power to only the RFID chips 108*a* they are connected to, or to other RFID sensor 108. The electrical energy and/or date from measurements may be transmitted and received by other RFID sensors 108 via RFID antenna 108*b*.

Figure 2:
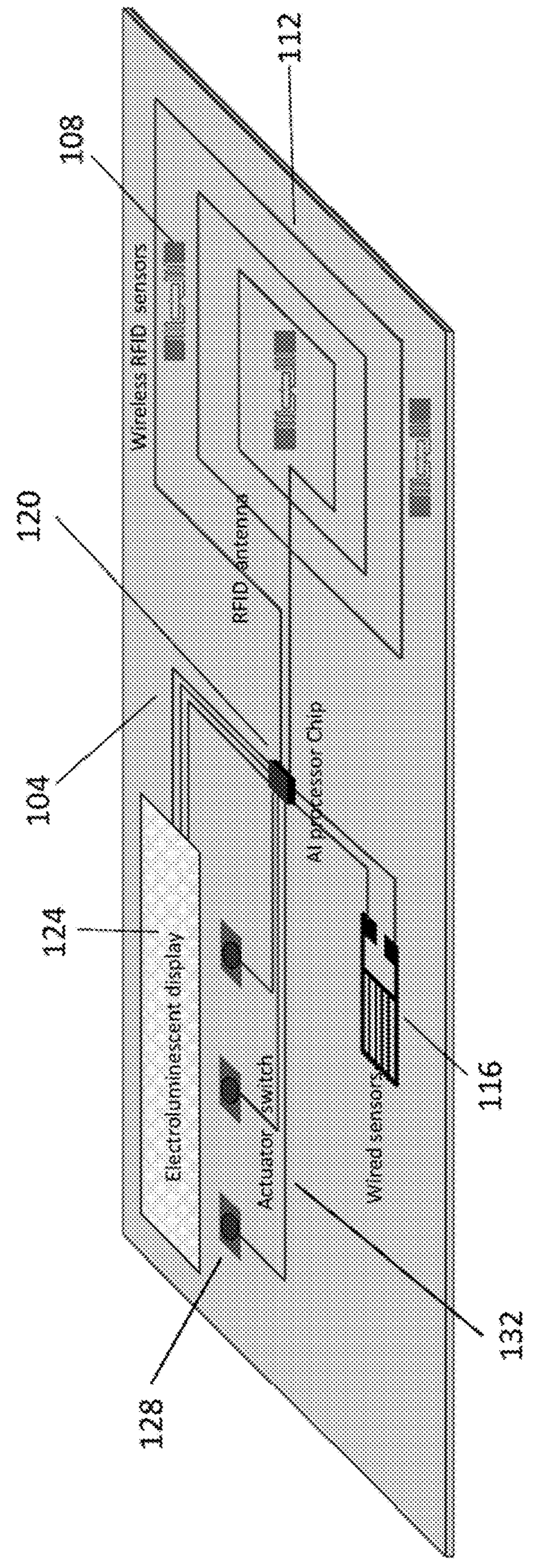
FIG. 2 is a schematic representation of a system for sensor-embedded composites in accordance with the disclosed subject matter.

Referring back to FIGS. 1 and 2, system 100 includes an antenna 112. Antenna 112 may be embedded within the composite structural panel 104. In various embodiments, antenna 112 may be embedded during the manufacturing process of the panel as described herein. in various embodiments, antenna 112 may be embedded within composite structural panel 112 after the manufacturing process such as inserted within an opening in the panel. A printed conductive wire network or interwoven conductive fiber network is used to serve as antenna coil for the RFID tag inside, or on the surface of, a laminate. Antenna 108 may be configured to transmit and/or receive information from the RFID sensors 108. For example and without limitation, one or more physical phenomena, such as impact, temperature, or a crack may cause a physical deformation or breaking on the antenna that cause alteration of the radio-frequency (RF) signal. By capturing and processing the signal from the tag using RFID reader, the alteration can be detected. In embodiments, the conductive wire network may be sinusoidal and/or spiral to obtain effective damage detection.

With continued reference to FIG. 1, system 100 includes wired sensors 116. Wired sensors 116 may be any sensor as described herein. In various embodiments, wired sensors 116 may be temperature, humidity, physical sensors, force sensors, strain and stress gages or the like. In various embodiments, wired sensors 116 may be the same type of sensors as RFID sensor 108. In various embodiments, wired sensors 116 may be a different type of sensor than RFID sensor 108. In various embodiments, a portion of wired sensors 116 may measure the same phenomena as a portion of RFID sensors 108.

With continued reference to FIG. 1, system 100 may include one or more electroluminescent panels (ELP) 124. In various embodiments, ELP 124 may form a portion of the composite structural panel 104. In various embodiments, ELP 124 may be the entire composite structural panel 104. In various embodiments, ELP 124 may be applied to the composite structure panel 104 during the manufacturing process. In various embodiments, ELP 124 may be formed during a pultrusion process. In various embodiments, ELP 124 may be applied after the manufacturing process such as an applique. In various embodiments, ELP 124 may be applied via an adhesive. In various embodiments, ELP 124 may be applied via one or more mechanical fasteners. In various embodiments, the size and shape of the ELP 124 may be adjusted by permanent operations, such as cutting, sawing, clipping or the like. In various embodiments, ELP 124 forms a flexible portion of composite structural panel 104. In various embodiments, ELP 124 forms a rigid portion of composite structural panel 104. ELP 124 will be discussed in greater detail herein below.

With continued reference to FIG. 1, system 100 may include one or more actuator switches 128. Actuator switch 128 may be configured to receive a signal from one or more components, such as processor 120 or computing devices. Actuator switch 128 may be a relay or physical switch configured to be opened or closed based on a wired or wireless electrical signal. For example and without limitation, actuator switch 128 may be configured to activate or deactivate a component based on an electrical signal. Sensors 108, 116 and actuator switch 128 may be in electrical and communicatively connected to processor 120 via a wired connection with processor 120 using printed electrical traces 132. Printed electrical traces 132 may be any printed or embedded electrical connection on or in a composite structural panel 104 as described herein. For example and without limitation, actuator switch 128 may be configured to activate a heater or thermal energy generator to mold or deform a portion of composite structural panel 104 according to any detected damage thereto. In various embodiments, actuator switch 128 may be configured to activate one or more electrical components such as telecommunications equipment, computing devices or subsystems present within a vehicle or building of which composite structural panel 104 forms a part. For example and without limitation, actuator switch 128 may be configured to activate an electric motor to open or close a window in a building wherein composite structural panel 104 forms a portion of the window or wall. For example and without limitation, actuator switch 128 may be configured to activate an electric motor to open or close a window in a vehicle, such as an electric freight truck in response to one or more signals from processor 120.

Figure 4:
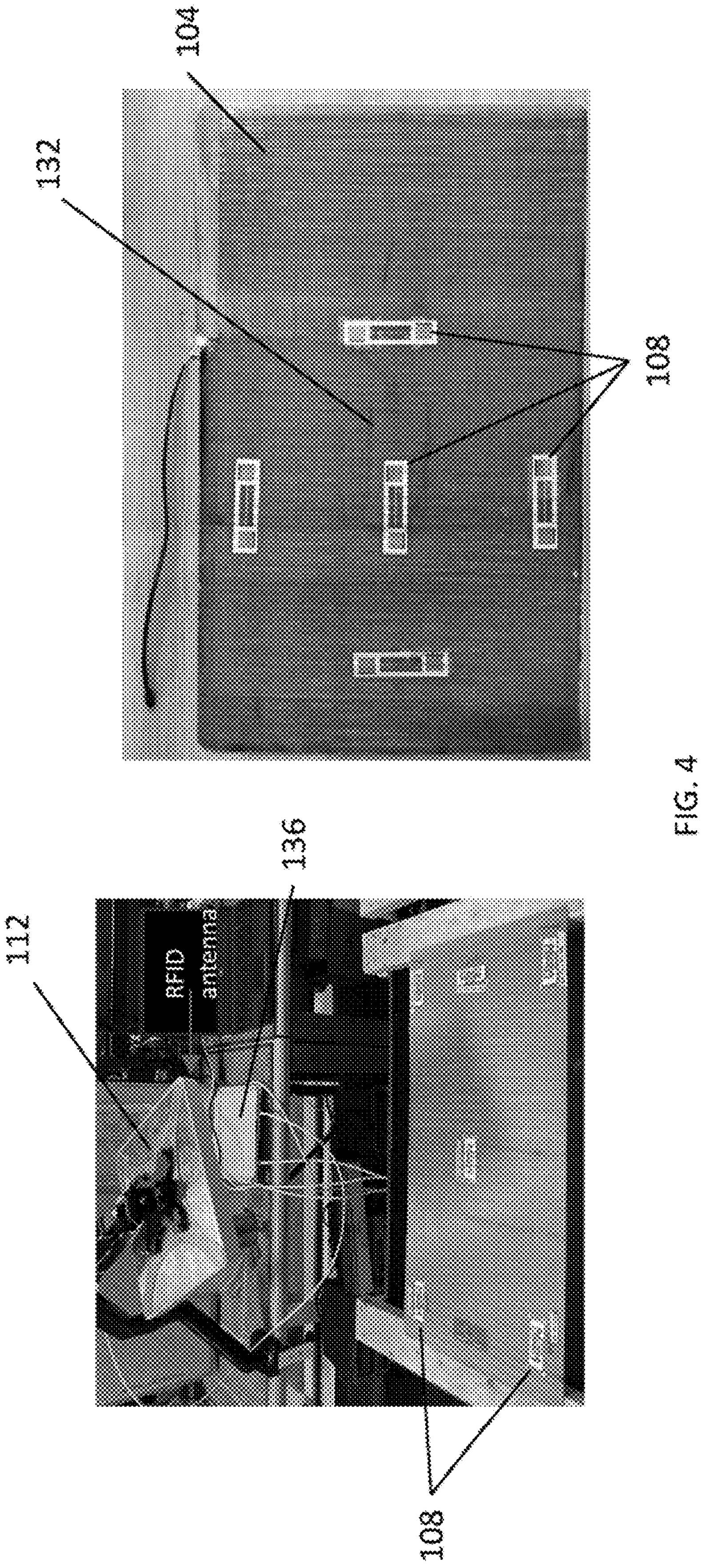
FIG. 4 depicts sensors embedded on a composite in accordance with the disclosed subject matter.

Referring now to FIG. 4, antenna 112 may be disposed exterior to the composite structural panel 104. In various embodiments, antenna 112 may be disposed exterior to the composite structural panel 104, but applied to the surface as an applique, such as RFID sensor 108. In various embodiments, antenna 112 may be disposed on the super structure the composite structural panel 104 is attached to or forms a portion of. In various embodiments, antenna 112 may be electrically and communicatively connected to a reader 136.

Reader 136 may be configured to detect information from the RFID sensors 108 and feed that data to one or more components, such as computing devices, as will be described further herein. In various embodiments, reader 136 may be associated with one or more key sensors. In various embodiments reader 136 may be associated with one RFID sensor 108. In various embodiments, reader 136 may be configured to read each and every RFID sensor 108 associated with a composite structural panel 104 (or alternatively only select sensors). In various embodiments, reader 136 may be external to the composite structural panel 104. In various embodiments, reader 136 may be embedded in the composite structural panel 104. In various embodiments, reader 136 may be placed within the surface of the composite structural panel 104 (e.g. located at a depth spaced from the upper/lower surface of the composite product). In various embodiments, reader 136 may be located far away from the RFID sensors 108, receiving the information from the RFID sensor 108 from the sensors themselves and/or through antenna 112. In various embodiments, reader 136 may be located within a vehicle on which composite structural panel 104 forms a part. In various embodiments, reader 136 may be located within a building, room or other type of structure for which composite structural panel 104 forms a part.

Referring now to FIG. 5A, several embodiments of RFID embedded composite structural panels are presented in schematic diagrams. As previously described, RFID sensors 108 may be embedded into, or onto, the composite structural pane 104. Antenna 112, communicatively connected to reader 136 may be emplaced within, on or remotely/external from the composite structural panel 104. In various embodiments, as was shown in reference to FIGS. 4 and 5, antenna 112 may be disposed external to the composite structural panel 104, configured to deliver a signal to at least one of the RFID sensors 108. In various embodiments, this signal form the antenna to the RFID sensors 108 may be signals carrying energy to power the RFID sensor 108. In various embodiments, the signal is electromagnetic energy, such as radiofrequency spectra energy configured elicit a response from the RFID sensor 108. In various embodiments, the RFID sensor is configured to turn on in response to the energy from the antenna 112. In various embodiments, the RFID sensor 108 is configured to turn off in response to the energy from the antenna 112. In various embodiments, RFID sensor 108 may be configured to take a measurement in response to the energy from the antenna 112.

In various embodiments, RFID sensor 108 may be configured to alter the measurement method, change modes, measure a different parameter than one or more previous measurement cycles, or the like, in response to the energy from the antenna 112. In various embodiments, RFID sensor 108 may be configured to perform a periodic or cyclic function in response to the energy from the antenna 112. In various embodiments, RFID sensor 108 may be configured to perform a measurement based on the energy from the antenna 112, for example and without limitation, a first signal may correspond to ta first measurement type, such as temperature, and a second signal may correspond to a second measurement type, such as humidity. As one of ordinary skill in the art would appreciate after review of this disclosure, RFID sensor 108 may include a sensor suite, thereby capable of measuring a plurality of physical and electrical phenomena.

With continued reference to FIG. 5A, RFID sensor 108 may be configured to transmit data to the antenna 112 in response to the energy signal received therefrom. In various embodiments, RFID sensor 108 may be configured to transmit one or more electrical measurements to the antenna 112. In various embodiments, RFID sensor 108 may be configured to transmit one or more physical or distance measurements to the antenna 112. In various embodiments, RFID sensor 108 may be configured to transmit one or more temperature, humidity, anemometer, or other environmental measurements to the antenna 112. In various embodiments, RFID sensor 108 may be configured to transmit one or more strain, stress, impact, force, or other directionally-based physical measurements to the antenna 112. In various embodiments, RFID sensor 108 may be configured to transmit one or more performance related measurements to the antenna 112, such as vibration, oscillation, resonance, or the like. In various embodiments, RFID sensor 108 may be configured to transmit one or more damage measurements to the antenna 112, such as cracks, deformities, pressure, and the like. In various embodiments, RFID sensor 108 may be configured to transmit one or more fatigue measurements to the antenna 112. RFID sensors 108 may be configured to transmit data to one or more RFID sensors 108 alternatively or in addition to transmitting said data to antenna 112. Antenna 112 is communicatively connected to reader 136 as described herein.

With continued reference to FIG. 5A, system 100 includes processor 120. Processor 120 may be any chip, system, system-on-a-chip (SOC), or other computing device configured to receive the data from reader 136. Processor 120 may receive data from reader 136. Processor 120 may receive data from antenna 112. Processor 120 may receive data directly from at least RFID sensor 108. In various embodiments, processor 120 may receive data from each RFID sensor 107. Processor 120 may be electrically and/or communicatively connected with any component described herein. For example and without limitation, processor 120 may be connected via wired connections, as shown in FIG. 5. In various embodiments, processor 120 may be electrically and/or communicatively connected via a wireless connection, for example over a cellular network. In various embodiments, processor 120 may be electrically and/or communicatively connected via a WiFi connection.

In various embodiments, processor 120 may be an AI processor, as shown in FIG. 1. It would be appreciated by one of ordinary skill in the art, after review of the entirety of this disclosure, that processor 120 may include one or more algorithms, methodologies or series of steps for receiving, parsing, conditioning and otherwise manipulating data with or without AI algorithms. In various embodiments, processor 120 may be an AI processor utilizing one or more machine-learning algorithms.

Processor 120 may include one or more machine learning (ML) modules. The one or more RFID sensors 108 may send data to one or more computing devices, such as processor 120. In various embodiments, the reader 136 may be configure to send one or more signals to one or more computing devices, each of which may employ one or more machine learning (ML) or artificial intelligence (AI) modules. In various embodiments, the one or more computing device sand the one or more ML/AI modules may receive one or more signals, attenuate said signals, calibrate one or more sensors and/or actuator 128*s*, filter said signals, process said signals, and send one or more commands to the sensors and/or actuator 128*s* in response to said signals.

Processor 120 may be configured to include a signal conditioner and a signal analyzer. Processor 120 may be configured to generate action command, the action command transmitted to one or more components. Action command may be stored in one or more databases for further training of processor 120 or any ML module it comprises. Processor 120 may be configured to intake a plurality of data point detected by sensors RFID 108 and generate action commands that are intended to direct vehicle maintenance, self-repair the damage, if found, improve vehicle dynamics, improve ride dynamics for the driver, a passenger or occupant of sleeper cabin or the like. Processor 120 may be a portion of a controller or other computing device located on or communicatively connected to the vehicle. Processor 120 may collect and analyze data over time from said RFID sensors 108, the processor 120 improving the control loops based on the past data and user experience and interaction.

With continued reference to FIG. 5A, system 100 may include reinforcement fabric 140. Reinforcement fabric 140 may be one or more lamina of fabric, resin-impregnated fabric or other material overlaid on composite structural panel 104. For example and without limitation, reinforcement fabric 140 may be the same type of lamina that forms composite structural panel 104. In various embodiments, reinforcement fabric 140 may be a different type of lamina than that which forms composite structural panel 140. Reinforcement fabric 140 may include one or more additives, coatings or other applications that seal reinforcement fabric 140 against the ingress of fluids such as air or water. In various embodiments, reinforcement fabric 140 may be configured to provide structural rigidity to composite structural panel 104 such as strength in one or more directions relative to the panel. For example and without limitation, the fibers of reinforcement fabric 140 may be oriented along a direction in which greater strength is desired. In various embodiments, the fibers of reinforcement fabric 140 may be oriented transverse or at an angle to the direction in which greater strength is desired. In various embodiments, reinforcement fabric 140 may be configured to increase the rigidity of the composite structural panel 104 in the direction orthogonal to the panel's surface, by for example and without limitation, adding thickness to the panel. In various embodiments, reinforcement fabric 140 may be applied after the manufacturing process of composite structural panel 104 by adhesive, chemical fastening or mechanical fastening. In various embodiments, reinforcement fabric 140 may be applied during the manufacturing process, such as after the embedding of the RFID sensors 108. In various embodiments, reinforcement fabric 140 may be applied during pultrusion. In various embodiments, reinforcement fabric may be applied during VARTM.

Figure 5B:
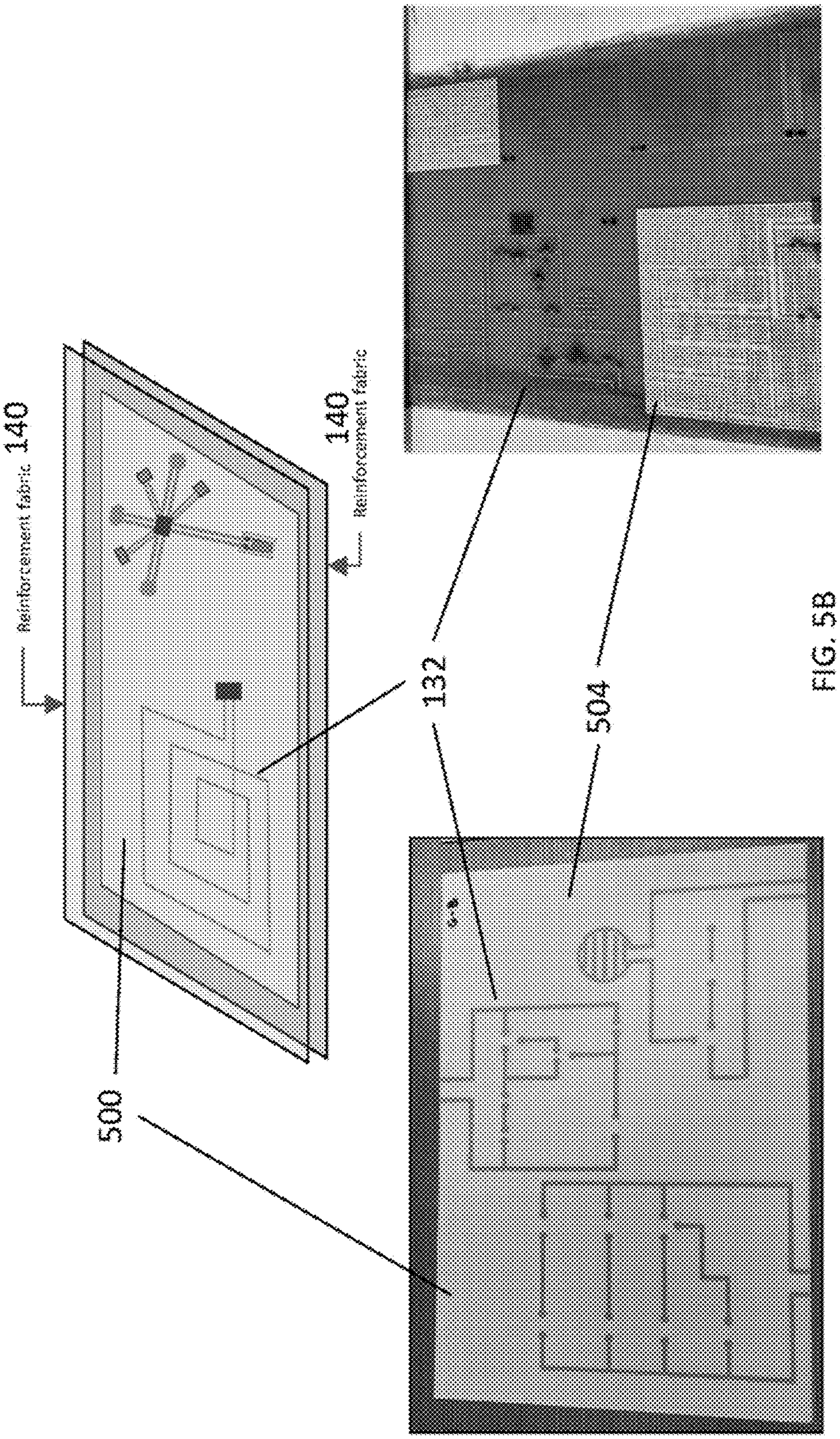
Figure 5C:
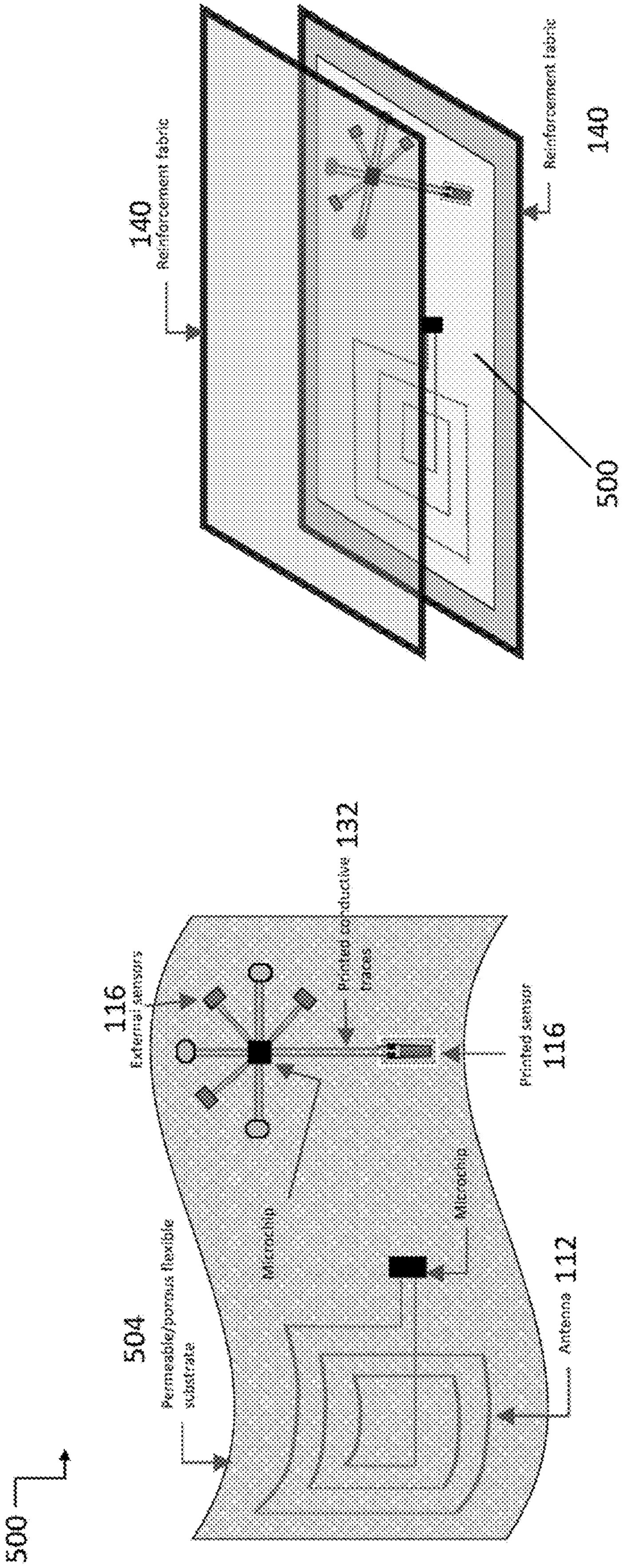

Referring now to FIGS. 5B and 5C, composite structural panel 104 is shown with conductive traces 132 shown in schematic diagrammatical view. In various embodiments, conductive traces 132 may be wires forming a flexible circuit 500. In various embodiments, a plurality of conductive traces 132 may be formed on a substrate 504, forming a flexible circuit 500. Flexible circuit 500 may be printed on a fabric or paper substrate 504. The substrate 504 may be perforated or generally permeable as to be infusible with resin. For example and without limitation, flexible circuit 500 may be emplaced between reinforcement fabrics 140, forming composite structural panel 104. The substrate 504 may be perforated with a plurality of relatively small holes, the holes allowing resin to pass through the substrate to infuse the fabrics during molding while providing for continuous conductive traces 132. Flexible circuit 500 may be formed from composite-compatible materials such as thermoplastic polyurethane (TPU). The TPU may be applied as an applique, like a sticker, on a permeable substrate 504 to make infusible.

In various embodiments, the flexible circuit 500 may be an array of conductors sandwiched between layers of very thin dielectric substrate. Printed flexible circuitry may be formed from conductive traces 132 deposited on one or more lamina of the composite structural panel 104 itself. For example and without limitation, conductive traces 132 may be printed as described herein below. In various embodiments, flexible circuit 504 may be laid between lamina of the composite structural panel 104 during the molding process, such as in resin transfer molding, VARTM or compression molding. In various embodiments, conductive traces 132 may form flexible circuitry which displays stronger signal quality, robust operating temperature range, size and weight reduction as compared to conventional wire harnesses. The traces 132 can include a plurality of nodes with a connecting segment therebetween. A gap or space can be provided between nodes of adjacent traces, as shown.

In various embodiments distinct conductive traces 132 may be configured to communicate with other conductive traces 132 through a wired connection or wirelessly. For example and without limitation, two flexible circuits 500 may be emplaced within two adjacent composite structural panels 104, each conductive trace 132 may be connected to each other via a wired connection, the wire extending from terminals or the traces themselves. In various embodiments, conductive traces 132 may form antennae on the flexible circuit 504 as described herein. In various embodiments, conductive traces 132 may transmit and receive signals through electromagnetic radiation, such as radio waves, among others. In various embodiments, a series of conductive traces 132 may be daisy chained together with data segregated between circuits based on ID address, frequency parsed or another means.

In various embodiments, as shown in FIG. 5C, sensors 116 and/or RFID sensors 108 may be connected in series to enable efficient data parsing methods. In various embodiments, embodiments, sensors 116 or RFID sensors 108 may be formed within the flexible circuit 500 during pultrusion, LRTM, HPRTM, VARTM and other molding processes. Embedding sensors within the fabric and therefore the composite structural panel 104 may reduce noise. Flexible circuit 500 may also include conductive traces 132, wires or other electrically conducting surfaces forming antenna 112 as described herein. In various embodiments, conductive traces 132 may connect any number of microchips, such as processor 120 or printed sensors, wired sensors 116 or RFID sensors 108. The embedded flexible circuit 500 within composite structural panel may be configured to bend around corners, twist or otherwise remain operable within the shape the composite structural panel 104 is formed within.

Structural Health Monitoring

Figure 6A:
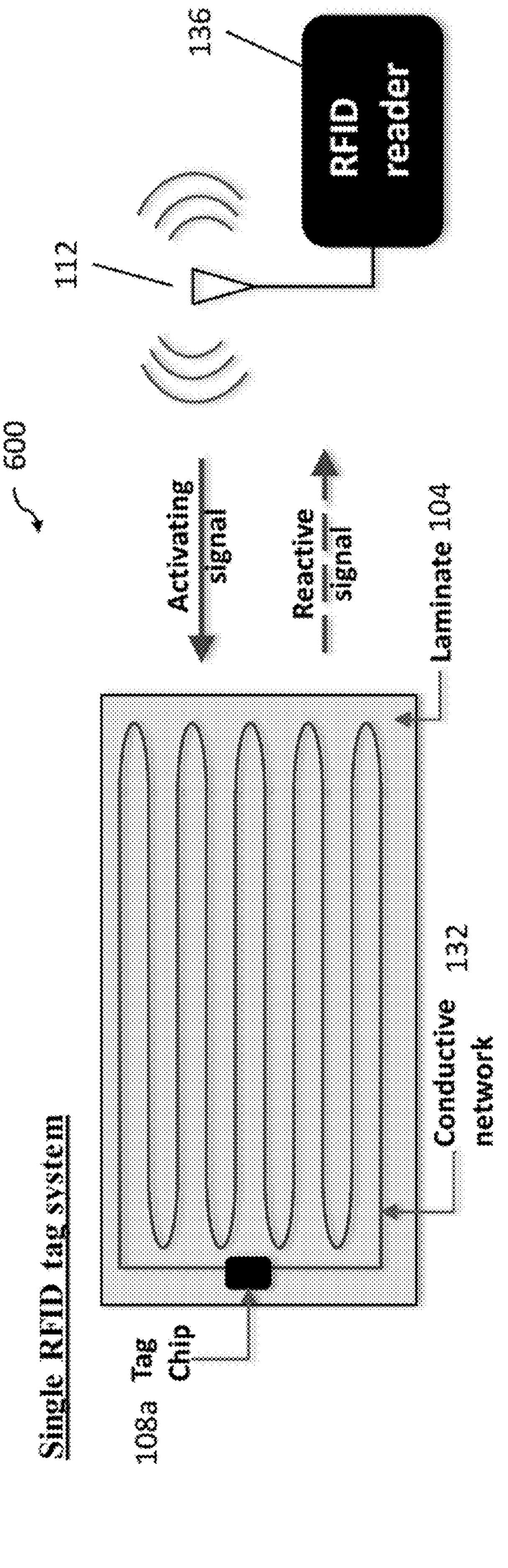
FIGS. 6A-D are a schematic representation of a system for structural health monitoring utilizing RFID conductive wire networks and a single RFID reader.

Referring now to FIG. 6A, system 600 includes at least one RFID sensor 108 or RFID chip 108*a* disposed on composite structural panel 104. In various embodiments, RFID chip 108*a* may be disposed within the composite structural panel 104 as described herein. In various embodiments, RFID chip 108*a* may be adhered to the surface of composite structural panel 104. In various embodiments, RFID chip 108*a* may be encapsulated proximate the surface of composite structural panel 104 by a fabric, sealant or top layer. In various embodiments, at least one RFID sensor 108 or RFID chip 108*a* may be disposed on the surface of a composite structural panel 104 and configured to measure at least an electrical parameter associated with a portion of the panel.

The plurality of sensors may be disposed on the inside or outside of any given portion of composite structural panel 104. Each of the plurality of sensors may include parallel resistors, piezoelectric and/or dielectrics, radio-frequency identification (RFID) tags, strain gages, capacitors, inductors, or the like. In embodiments, the resistors may be arranged in parallel and in a parallel electric circuit. Each of the plurality of resistors includes a varied length and are set up in a triangular pattern such that each successive resistor is longer than the immediately previous.

Still referring to FIG. 6A, an RFID tag may be used to measure damage to the panel. A printed conductive wire network 132 or interwoven conductive fiber network is used to serve as antenna coil for the RFID tag inside or on the surface of a composite structural panel 104. During service, a crack may cause a physical deformation or breaking on the antenna that cause alteration of the radio-frequency (RF) signal. By capturing and processing the signal from the tag using RFID reader 136, the alteration can be detected. In embodiments, the conductive wire network 132 may be sinusoidal and/or spiral to obtain effective damage detection as shown in reference to FIG. 6D.

Figure 6B:
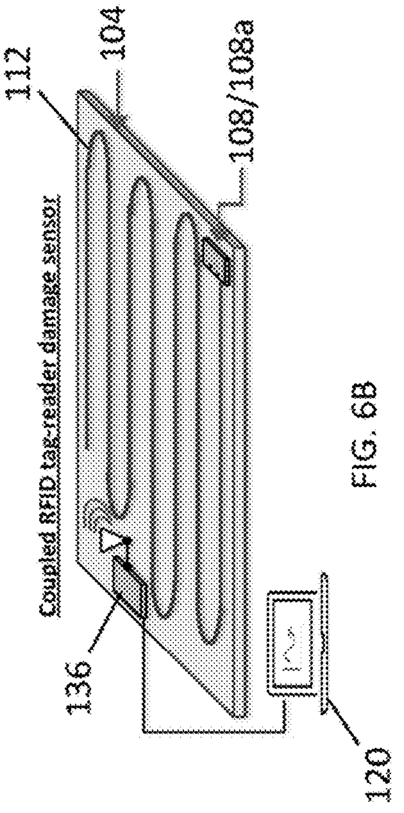
Figure 6C:
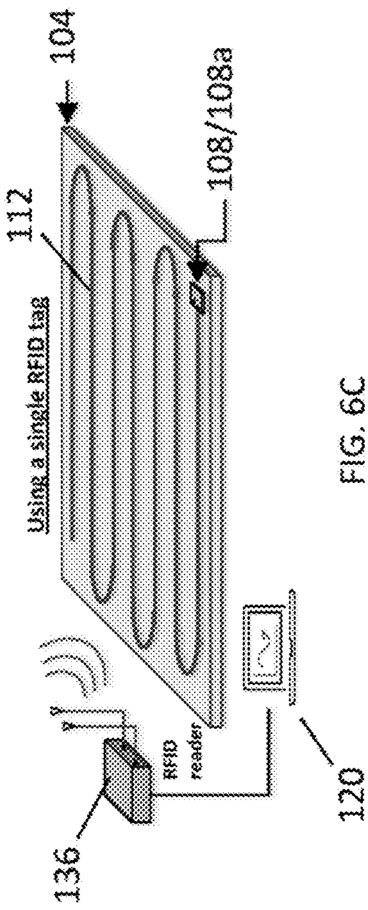
Figure 6D:
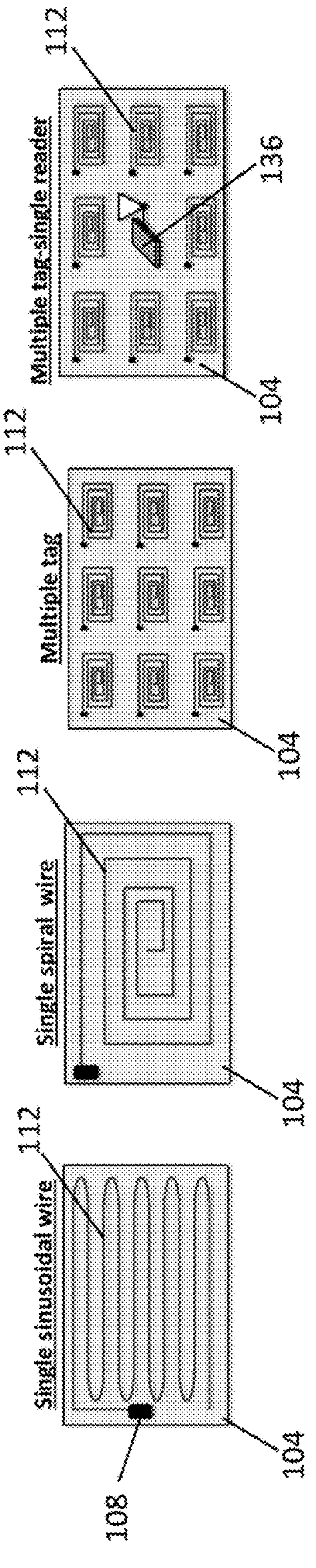

Referring to FIG. 6B-D, various embodiments of system 600 are shown in schematic diagram form. Each of FIGS. 6B and 6C show a portion of a composite structural panel 104 having an RFID sensor 108 emplaced thereon or therein. RFID sensor 108 can be embedded as described herein. Systems 600 may include an RFID reader 136 as described herein above. As can be seen in FIG. 6B, the reader 136 can be emplaced on the composite structural panel 104, the reader 136 may be configured to read the data from one or more RFID sensors 108 via antenna 112 or transmitted directly from the sensors. In various embodiments, as can be seen in FIG. 6C, reader 136 may be located remotely to composite structural panel 104. In both FIGS. 6B-C, reader 136 is communicatively connected to processor 120, which is configured to receive data from the reader 136 and perform one or more operations on said data to execute one or more action commands as described herein. In various embodiments, processor 120 may be configured to store the data and make no responsive actions to the incoming data.

Referring specifically to FIG. 6D, a plurality of exemplary embodiments of the composite structural panel 104 having one or more RFID sensors 108 and antennae 112 configurations are shown in planform schematic view. As described herein, RFID sensor 108 may have a single sinusoidal antenna 112, whether formed from printed conductive traces 132 or formed from wires. In various embodiments, a single RFID sensor 108 may have a single spiral antenna 112, whether formed from printed conductive traces 132 and/or formed from wires. In various embodiments, composite structural panel 104 may include a plurality of RFID sensor 108 emplaced thereon or therein, as has been described in detail above. Each RFID sensor 108 of the plurality of sensors may have the same type of antenna 112. In various embodiments, each RFID sensor 108 may have a unique configuration of antenna 112. In various embodiments, a subset of RFID sensors 108 may have a spiral antenna 112 and a second subset of RFID sensors 108 may have sinusoidal antenna 112. In various embodiments, as described herein, the composite structural panel 104 may have a plurality of sensors emplaced thereon with a reader 136 also emplaced thereon. In various embodiments, reader 136 may be emplaced remotely to the composite structural panel 104.

Figure 7A:
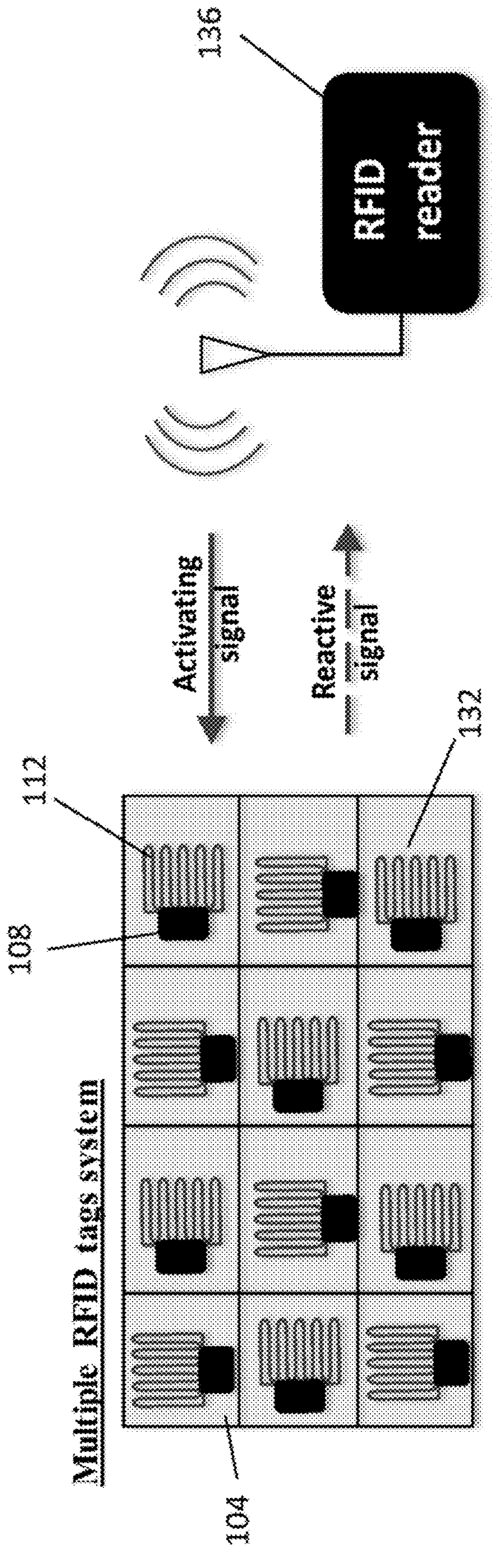
FIGS. 7A-D is a schematic representation of a system for structural health monitoring utilizing RFID conductive wire networks and tags and a single RFID reader, in embodiments.

Referring now to FIG. 7A, a plurality of tags with conductive network antenna may be used to locate where the damage has occurred. For example and without limitation, there may be a plurality of RFID readers, wire networks or a combination thereof. For example and without limitation, there may be a plurality of RFID tags, and a single RFID reader.

Figure 7B:
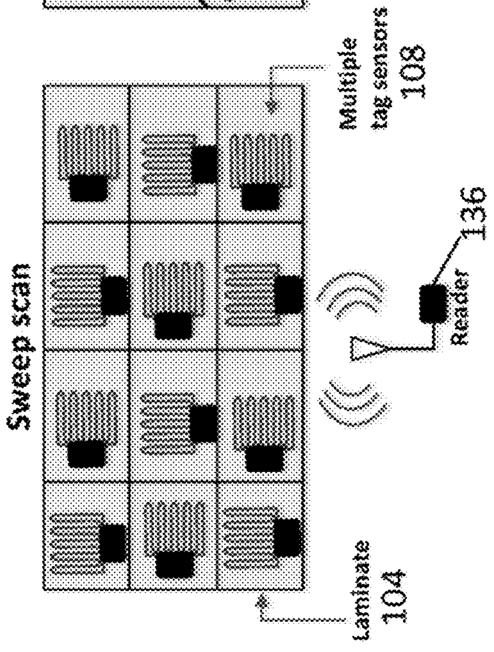

Referring to FIG. 7B, the frequency of data collection of RFID reader 136 from the one or more wire networks 112 may be periodic, wherein RFID reader 136 is stationed at a fixed position exterior to the composite structural panel 104, wherein the composite structural panel 104 will pass by the fixed position such that the RFID sensors 108 will sweep across said RFID reader 136. The RFID sensors 108 disposed inside or on the surface of composite structural panel 104 may be individually detected and read, wherein data is transmitted to the reader from each of the RFID sensors 108.

Figure 7C:
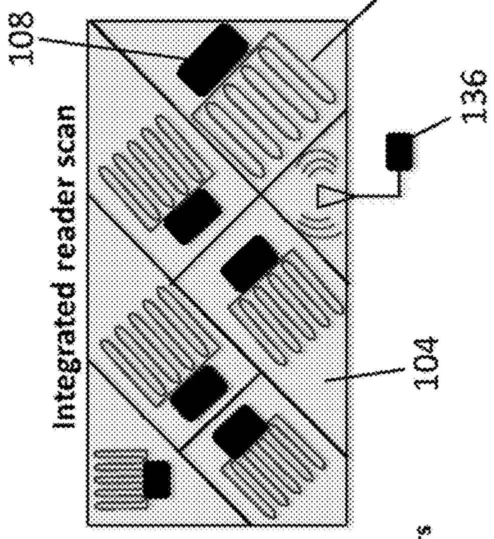

Referring to FIG. 7C, the frequency of data collection of RFID reader 136 from the one or more wire networks 112 may be continuous, wherein the RFID reader 136 and RFID sensors 108 are integrated within the composite structural panel 104. The RFID sensors 108 may be configured to continuously transmit data from live measurements taken in real time. In various embodiments, RFID sensors 108 may be configured to transmit data continuously, wherein the data being transmitted corresponds to historical measurement. In various embodiments, the RFID reader 136 may be configured to continuously receive data from the RFID sensors 108, or continuously be prepared to receive the data, doing so when the RFID sensors 108 have measured an event or are powered on by another component of the system as described herein. The system may continuously or periodically communicate and continuously assess the structural health of the composite structural panel 104.

Figure 7D:
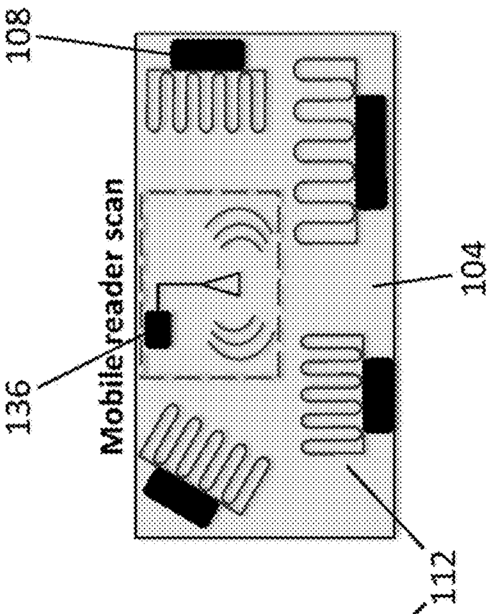

Referring to FIG. 7D, the frequency of data collection of RFID readers 136 may be intermittent. Reader 136 may be emplaced on a designated area of the composite structural panel 104 in order to receive data from the RFID sensors 108, which may have been remotely powered by a signal from the RFID reader 136. In various embodiments, reader 136 may have designated locations to read certain subsets of the RFID sensors 108. For example and without limitation, reader 136 may be placed proximate a first portion of RFID sensors 108 and placed at a second location proximate a second portion of RFID sensors 108. In various embodiments, RFID sensors 108 may be continuously or periodically measuring and transmitting data corresponding to said measurements, the reader 136 only receiving said data when brought into proximity with the RFID sensors 108.

Figure 8:
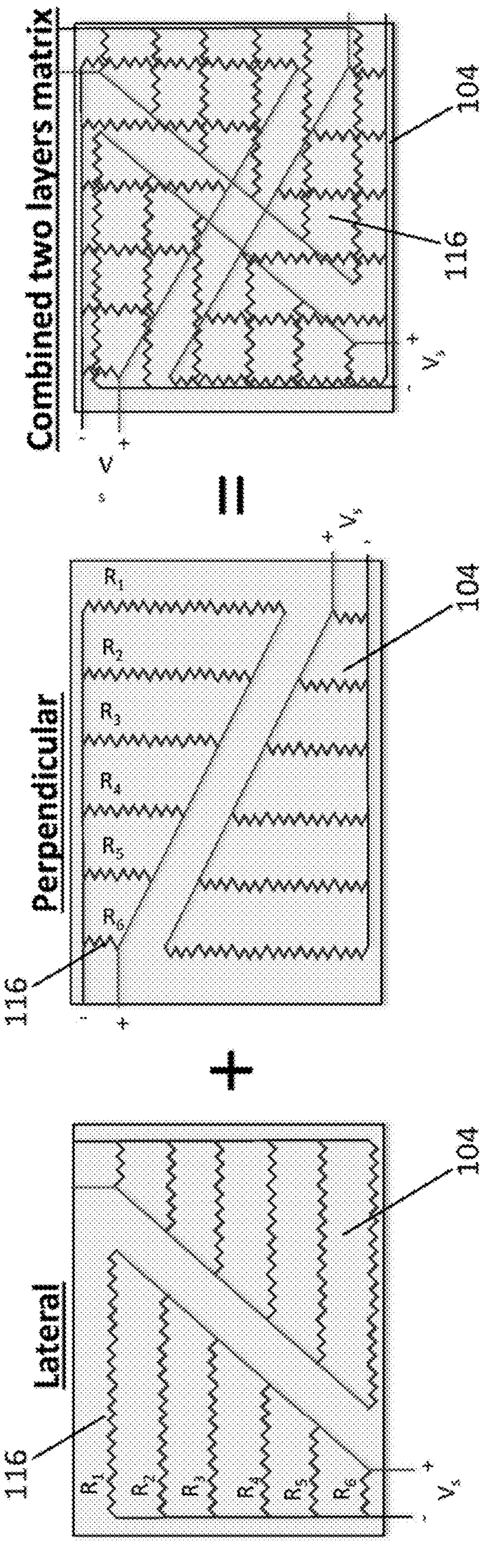
FIG. 8 is a schematic representation of the system for structural health monitoring in accordance with the disclosed subject matter.
Figure 9:
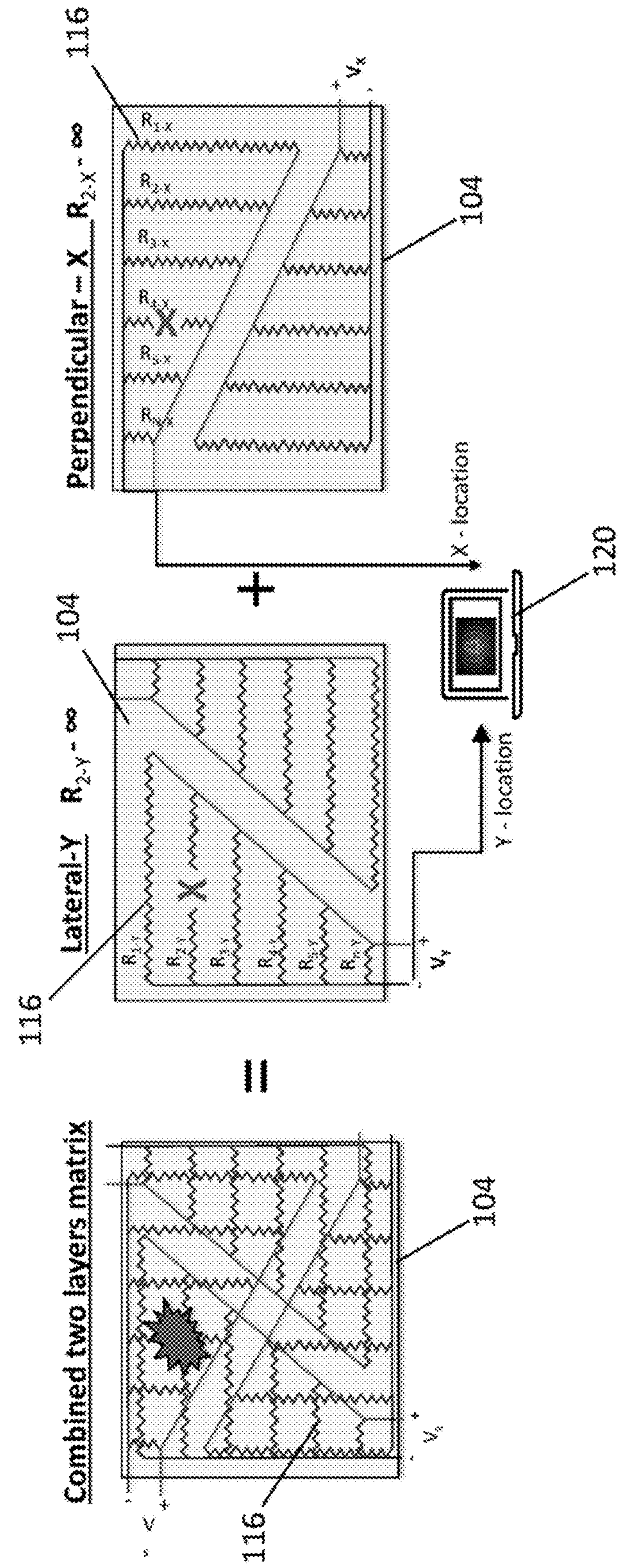
FIG. 9 is a schematic representation of the system for structural health monitoring in accordance with the disclosed subject matter.

Referring now FIGS. 8 and 9, the plurality of sensors, which may be RFID sensors 108 or wired sensors 116, may be disposed in regular rows, columns, grids, or in patterns. The plurality of wired sensors 116 may include sets of sensors working in tandem such as two layers of resistors wherein one set measures a damaged spot in a lateral direction and the second set of plurality of sensors 116 measures a damaged spot in a longitudinal direction. For example and without limitation, the deformation or breaking of any of the resistors in the system will introduce change to the current flowing in the circuit. This change in current may be monitored by a data acquisition system. The data acquisition system or processor 120 may analyze and process this electrical current change as an electrical datum and associate this datum with a condition. This condition may include a stress, strain, force, impact, dent, crack, or deformation and in embodiments, the severity associated with each. In the exemplary embodiment shown, the sensor system extends around/across the entire dimension(s) of the composite panel 104; however alternative designs, e.g. spanning only a portion of the composite panel, are within the scope of the present disclosure.

Referring to FIG. 9, system 800 includes a data acquisition system and/or processor electrically coupled to the plurality of sensors 116 and configured to receive the data transmitted by the sensors 116. The processor 120 may form a part of a data acquisition system (DAQ) or in embodiments, the DAQ may form a part of the processor 120. The DAQ may be the same or similar to any data acquisition system as described herein. The DAQ system may be one or more computer programs configured to receive the electrical data in any form as described herein. The DAQ system may be configured to receive the capacitance, deflection, resistance, current, voltage, force, or another type of data or combination thereof. The DAQ system may be configured to record the data continuously, periodically, or intermittently, as described herein.

Figure 10A:
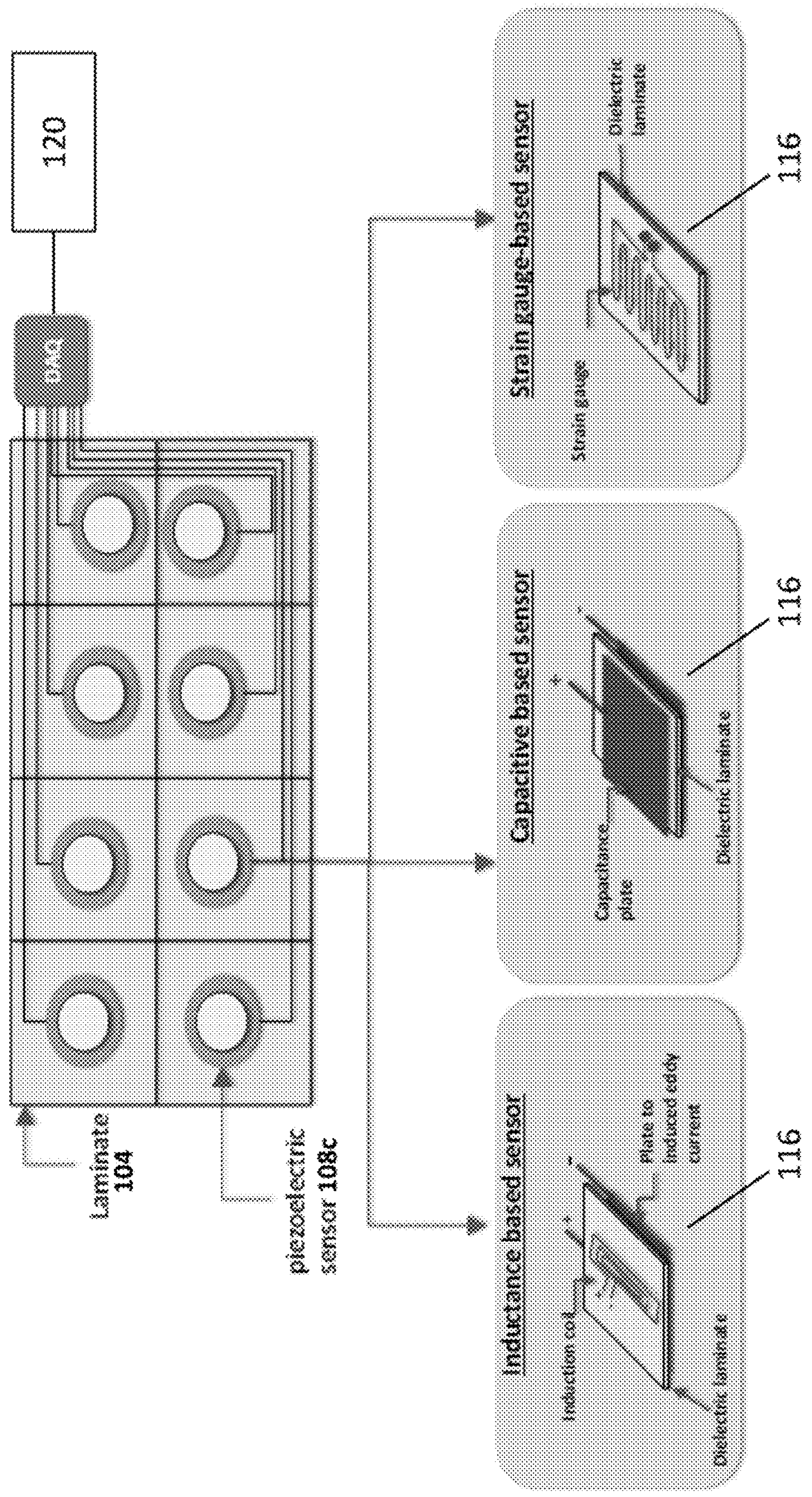
FIGS. 10A-C is a schematic representation of a system for structural health monitoring utilizing piezoelectric sensors, strain gages, capacitors, and inductors, respectively clockwise from top.
Figure 10B:
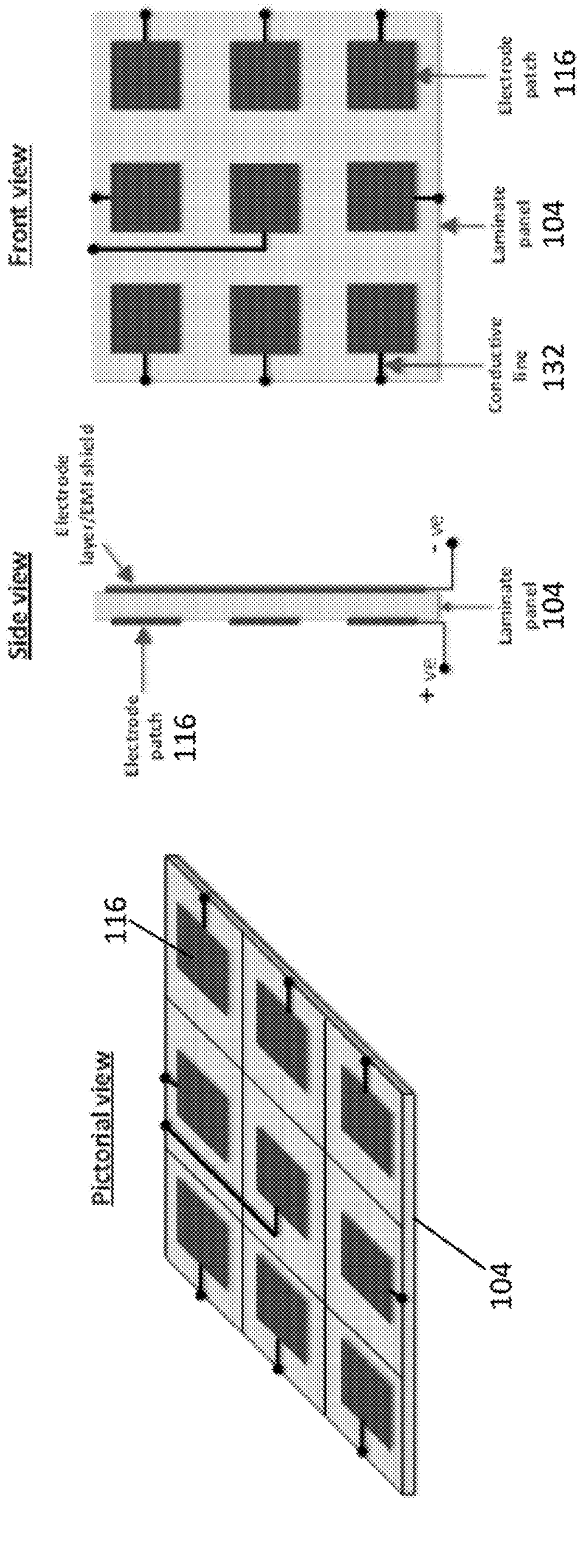
Figure 10C:
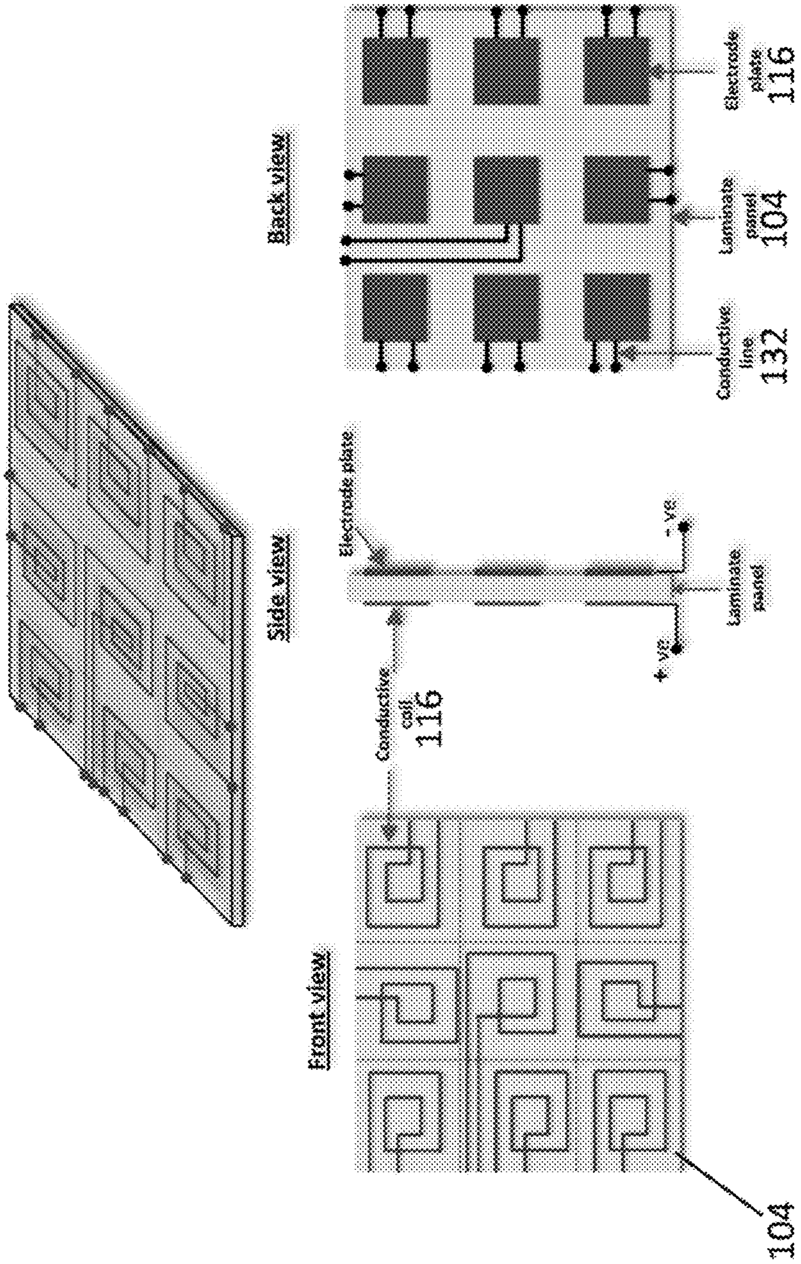

Referring to FIG. 10A-C, additionally or alternatively, the composite structural panel 104 may be segmented into a plurality of portions, each portion having at least one sensor 116 disposed therein. For example and without limitation, each segment may include a piezoelectric sensor 108*c* disposed therein. The PZT sensor 108*c* may be configured to measure any deformation, vibration, force, or other phenomena at each segment. This change in current through one or more wired sensors 116 may include a stretch of a resistance strain gage. In various embodiments, each wired sensor 116 may be the same type of sensor. In various embodiments, each wired sensor 116 may be a resistance strain gage. As shown in FIG. 10B, in various embodiments, each wired sensor 116 may be a capacitive based sensor, wherein the composite structural panel 104 acts as the dielectric sandwiched between two plates. As shown in FIG. 10C, in various embodiments, each wired sensor 116 may be an inductive coil type sensor, wherein an induction coil is placed on one side of the composite structural panel 104 and a conductive plate is placed on the other side wherein the panel is the dielectric, among others. Each wired sensor 116 may be electrically and communicatively connected to DAQ and processor 120.

With reference specifically to FIG. 10B, a composite structural panel 104 may be segmented into a plurality of portions, each segment having at least one wired sensor 116, said sensor being a capacitance based sensor.

Figure 11:
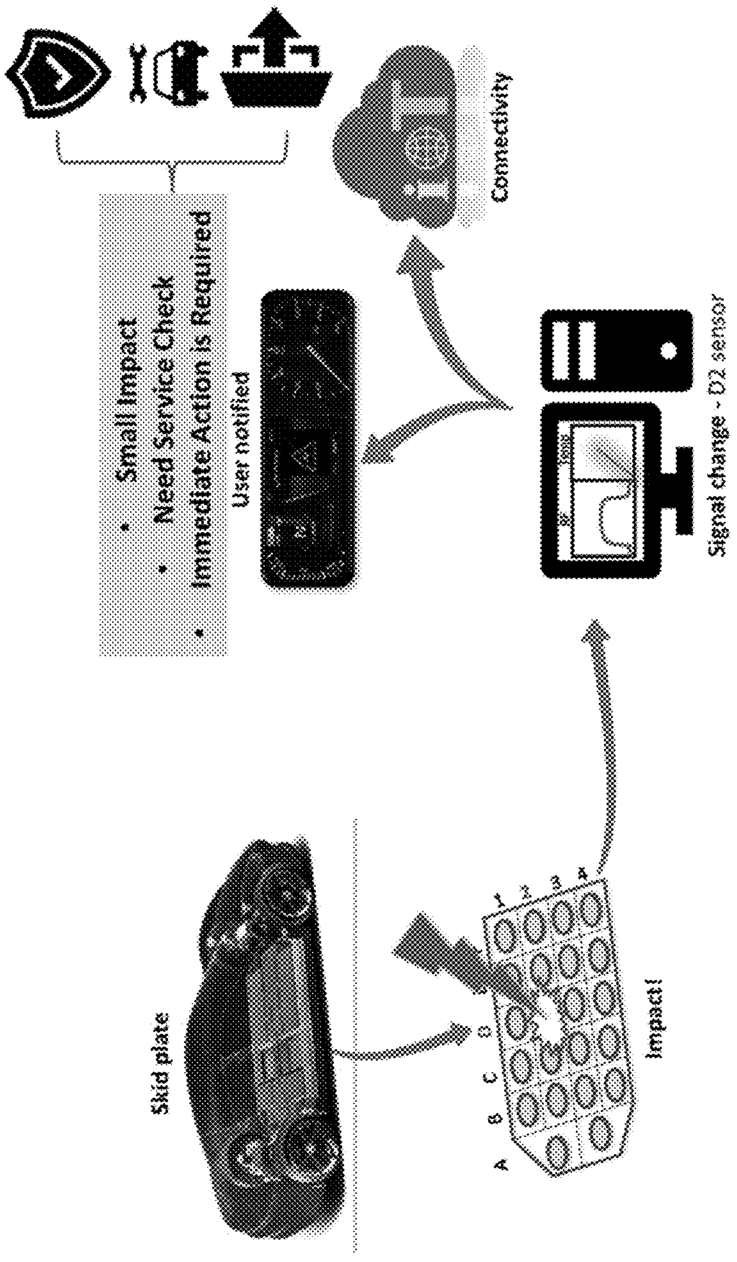
FIG. 11 is a schematic representation of a system for structural health monitoring according to the disclosed subject matter.

Referring to FIG. 11, system 800 is configured to alert a user by an alert system electrically coupled to at least the data acquisition system and configured to alert a user based on the at least an electrical datum. The alert system may be integral to the DAQ system, in embodiments. Alerting the user may include alerting one or more users electronic devices such with a call, text message, email, or push notification. Alerting the one or more user may include alerting one or more emergency responders such a paramedics, fire fighters, police, or military. Alerting the user may include one or more symbols, sounds, haptic notifications, or other notifications to the user interface of the vehicle, in embodiments. For example and without limitation, alerting the user by the alert system may include calling 1111 over the Internet of Things (IoT) and showing a message on the dashboard on the vehicle notifying a user of damage and instructions.

Example reporting: to OBD, display on instrument panel, to mobile device, up-loaded to Cloud service, aggregated to OE and/or NITSA.

Gravel hits body panel. Message sent to OBD. Display "Impact detected" Severity "1" Location "(X, Y) Recommended action "deflector shield OK"

Rock hits Message sent to OBD. Display "Damage detected" Severity "2" Location "(X, Y) Recommended action "get checked" service recommended.

Iron bar spear Message sent to OBD. Display "Shield failure detected" Severity "10" Location "(X, Y) Recommended action "Park & get out! Warning".

Structural Health Monitoring and Automated Repair

Figure 12:
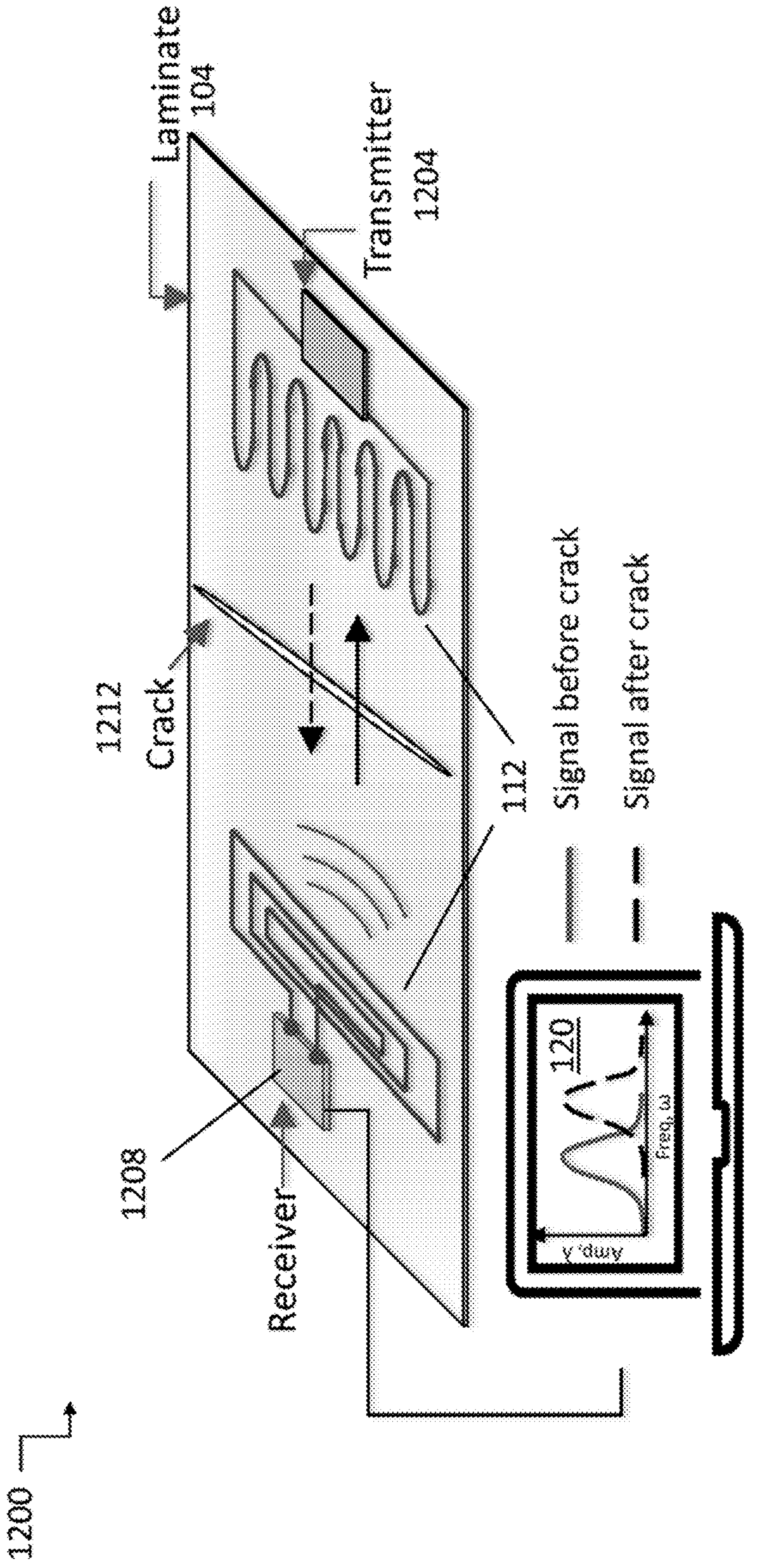
FIG. 12 is a schematic representation of the detection of a deformity in accordance with the disclosed subject matter.

As shown in FIG. 12, a system for damage detection and automated repair of a composite structural panel 104 is shown in schematic diagrammatical view. System 1200 include at least one radio frequency (RF) wave transmitter 1204 disposed on a first portion of the composite structural panel 104 configured to emit radio frequency waves through the composite structural panel 104. The at least one radio frequency wave transmitter 1204 may include a plurality of radio frequency wave transmitters 1204 disposed in rows, columns, groupings, pair with receivers 1208 as describe herein, or the like. The plurality of radio frequency wave transmitters 1204 may be disposed at a plurality of points around the composite structural panel 104 at a plurality of angles and coupled with a plurality of radio frequency wave receivers 1208, as in FIG. 13. The arrangement of transmitters 1204 and receivers 1208 may be configured to locate the deformation 1212 associated with the at least one wave datum after processing by one or more systems herein. The radio frequency wave transmitter 1204 is configured to generate radio frequency waves that are capable of traveling through non-metallic materials such as the composite structural panel 104, or any portion thereof. The radio frequency waves may be configured to target a specific radio wave receiver 1208 or a plurality thereof. The radio frequency wave transmitter 1204 may be configured to emit radio waves continuously, periodically, intermittently, when commanded, according to environmental conditions, a combination thereof, or another methodology altogether.

With continued reference to FIG. 12, system 1300 includes at least one radio frequency wave receiver 1208 disposed on a second portion of the composite structural panel 104, the receiver 1208 configured to receive the emitted radio frequency waves. The radio frequency wave receiver 1208 may be configured to search for and receive radio frequency waves continuously, periodically, intermittently, when commanded, according to environmental conditions, a combination thereof, or another methodology. The radio frequency wave receiver 1208 may be a plurality of radio frequency wave receivers 1208 disposed on the second portion of the composite structural panel 104 in rows, columns, grids, groupings, or paired with a transmitter 1204 or plurality thereof. The plurality of radio frequency wave receivers 1208 may be disposed at a plurality of points around the composite laminate at a plurality of angles and coupled with a plurality of radio frequency wave receivers, as in FIG. 13. The arrangement of transmitters 1204 and receivers 1208 may be configured to locate the deformation 1212 associated with the at least one wave datum after processing by one or more systems herein such as processor 120. The at least one radio frequency wave receiver 1208 may also be configured to transmit radio waves back to the transmitter 1204. The radio frequency wave receiver 1208 may be electrically and communicatively coupled to one or more computing systems configured to receive and analyze data associated with the radio waves to determine the type and location of the deformity such as processor 120.

Figure 13:
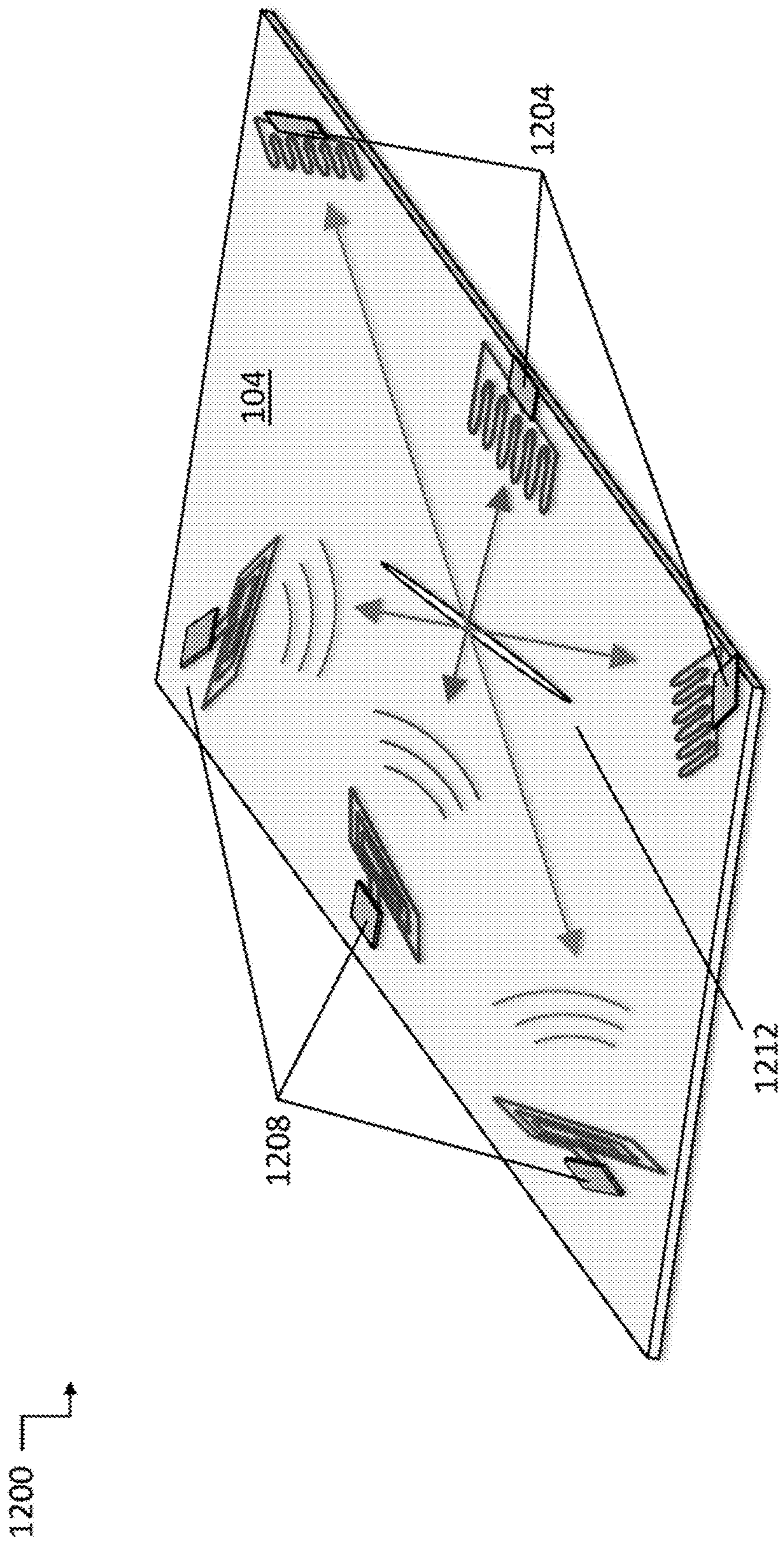
FIG. 13 is schematic representation of the location of a deformity in accordance with the disclosed subject matter.

Referring still to FIGS. 12 and 13, system 1200 includes detecting a deformity 1212 (e.g. crack or fracture) in a composite structural panel 104, wherein the composite structural panel 104 includes fibers and the deformity 1212 comprises property-altering damage to the composite structural panel 104. The composite structural panel 104 may be a portion of a vehicle such as an electric vehicle, air vehicle, or conventional vehicle. The composite structural panel 104 may be a portion of a structural integrated panel (SIP) in a building, house, or structure. The composite structural panel 104 may include one or more panels coupled together to form a skin, shell, body, or other structural or ornamental shape associated with a vehicle or building. The composite structural panel 104 may include a skid plate such as one used in an electric vehicle disposed on the bottom of the vehicle.

System 1200 may be configured to monitor a material state of damage (e.g. crack exceeds threshold; crack propagation; etc.) and presence of moisture continuously, periodically, or at predetermined instances while one or parts, such as the composite structural panel 104, is on service, in the field, installed on the vehicle, installed on or in a building, or the like. The composite structural panel 104 may include resin impregnated fibrous construction of a plurality of layers. The layers may be oriented such that their fibers are oriented in a plurality of directions providing strength in those directions and in many directions as a unit.

The composite structural panel 104 have an initial stiffness and mechanical characteristics associated with material, shape, coupling methodologies, and dimension. The composite structural panel 104 may include a crack, deformation, dent, hole, pore, space, lifted seal, voids, accumulation of moisture or another physical deformity 1212 from environmental damage, physical contact, electrical damage, or thermal wear, among others. The physical deformity 1212 such as the crack in FIG. 12 may alter the physical characteristics and properties of the composite laminate.

Additionally or alternatively, detecting and locating the deformity may be accomplished using a system of RFID sensors 108 embedded in the composite structural panel 108. For example and without limitation, the detection and location of a deformity 1212 may include a plurality of RFID sensors 108 disposed on at least a surface of the panel each configured to measure at least an electrical datum associated with a portion of the panel. The plurality of RFID sensors 108 may be disposed on the inside or outside of any given portion of composite structural panel 104. Each of the plurality of RFID sensors 108 may include parallel resistors, piezoelectric and/or dielectrics, radio-frequency identification (RFID) tags, strain gages, capacitors, inductors, or the like. In embodiments, the resistors may be arranged in parallel and in a parallel electric circuit. Each of the plurality of resistors includes a varied length and are set up in a triangular pattern such that each successive resistor is longer than the immediately previous.

Detecting and locating the defect may include the utilization of a data acquisition system electrically coupled to the plurality of sensors and configured to receive the at least an electrical datum. The data acquisition system may be the same or similar to any data acquisition system as described herein. The DAQ system may be one or more computer programs configured to receive the electrical data in any form as described herein. The DAQ system may be configured to receive the capacitance, deflection, resistance, current, voltage, force, or another type of data or combination thereof. The DAQ system may be configured to record the data continuously, periodically, or intermittently, as described herein. The DAQ may receive any data including one or more wave data, according to embodiments.

Figure 14:
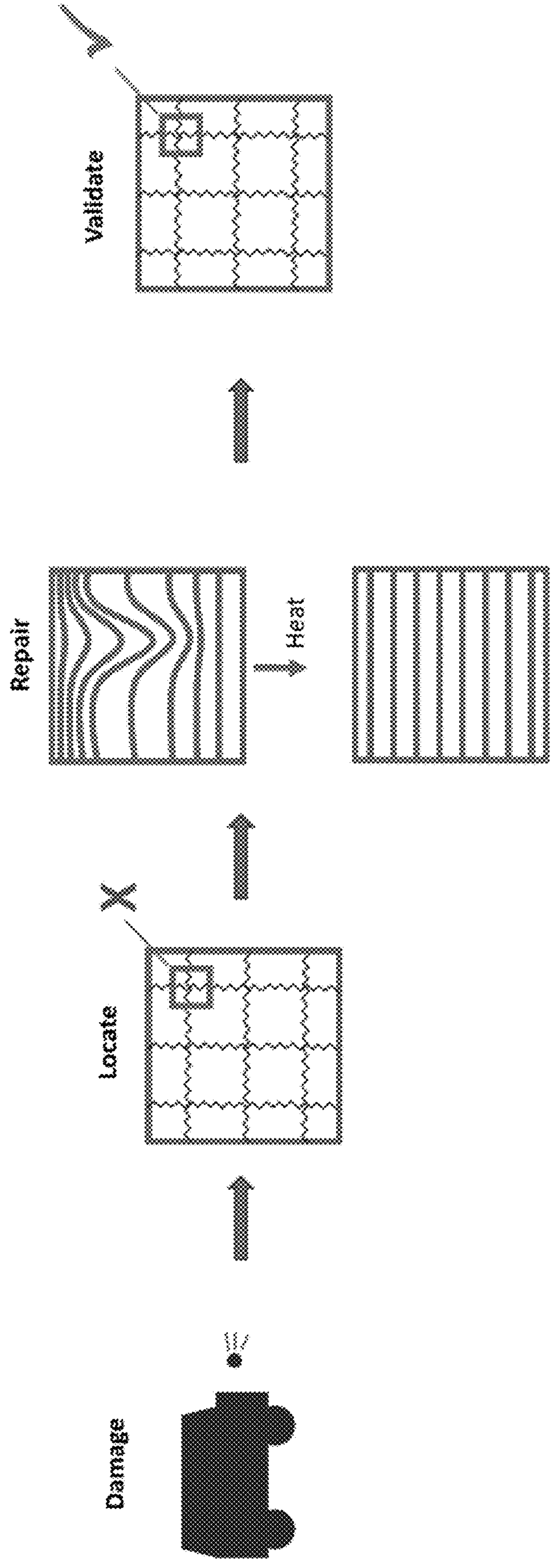
FIG. 14 is a schematic representation of the method describe herein in accordance with the disclosed subject matter.

Referring now to FIG. 14, system 1200 includes one or more components configured to repair the deformity 1212 locally, wherein repairing the deformity 1212 locally comprises activating a graphene layer underneath the deformity 1212 that melts a portion of the composite structural panel 104 to realign fibers found within the composite structural panel 104. The graphene layer may be heated by a heating element, chemically, or another method. The graphene layer may be heated to approximately 100~200 degrees Fahrenheit (e.g. 150 degrees F.) for over approximately 0.5~2 minutes (e.g. 1 min), in embodiments. In one embodiment of this system, a graphene layer is activated to heat at the detected deformity 1212 or the whole the structure. The heated resin system then fixes cracks, barely visible impact damage (BVID) or other defects caused during the life of the composite structural panel 104. In another embodiment, the resin system may be a vitrimer, wherein the heated structure can then self-heal without secondary patch. In another embodiment, the resin system may be a thermoplastic (e.g prepreg). In yet another embodiment, the systems may include shape memory alloys, polymers, or fibers, that, when heated, apply minor stresses to the part and help reorient it into the original shape without external loads.

Referring back to FIG. 12, system 1200 includes one or more components, such as RFID sensors 108, to validate the deformity 1212 has been repaired, wherein validating the deformity has been repaired comprises comparing the composite structural panel 104 to the measurement or detection by the RFID sensors 108. The validation is similar to or the same as the initial detection and location of that deformity, wherein the system may utilize radio waves to determine if the composite structural panel 104 contains deformities. Validating the repair was performed may include comparing the data from the pre-damaged composite laminate with the repair composite laminate and allowing a threshold of difference in the measured properties or characteristics.

Additionally, the system 1200 may include one or more components, such as processor or computing device, configured to alert a user that the deformity was detected, located, repaired, or unsuccessfully repaired, among other data. One or more systems described herein may be configured to alert a user by an alert system electrically coupled to at least the data acquisition system and configured to alert a user based on the repair of the deformity. The alert system may be integral to the DAQ system, in embodiments. Alerting the user may include alerting one or more users' electronic devices such with a call, text message, email, or push notification. Alerting the one or more user may include alerting one or more emergency responders such a paramedics, fire fighters, police, or military. Alerting the user may include one or more symbols, sounds, haptic notifications, or other notifications to the user interface of the vehicle, in embodiments. For example and without limitation, alerting the user by the alert system may include calling 911 over the Internet of Things (IoT) and showing a message on the dashboard on the vehicle notifying a user of damage and instructions.

Figure 15:
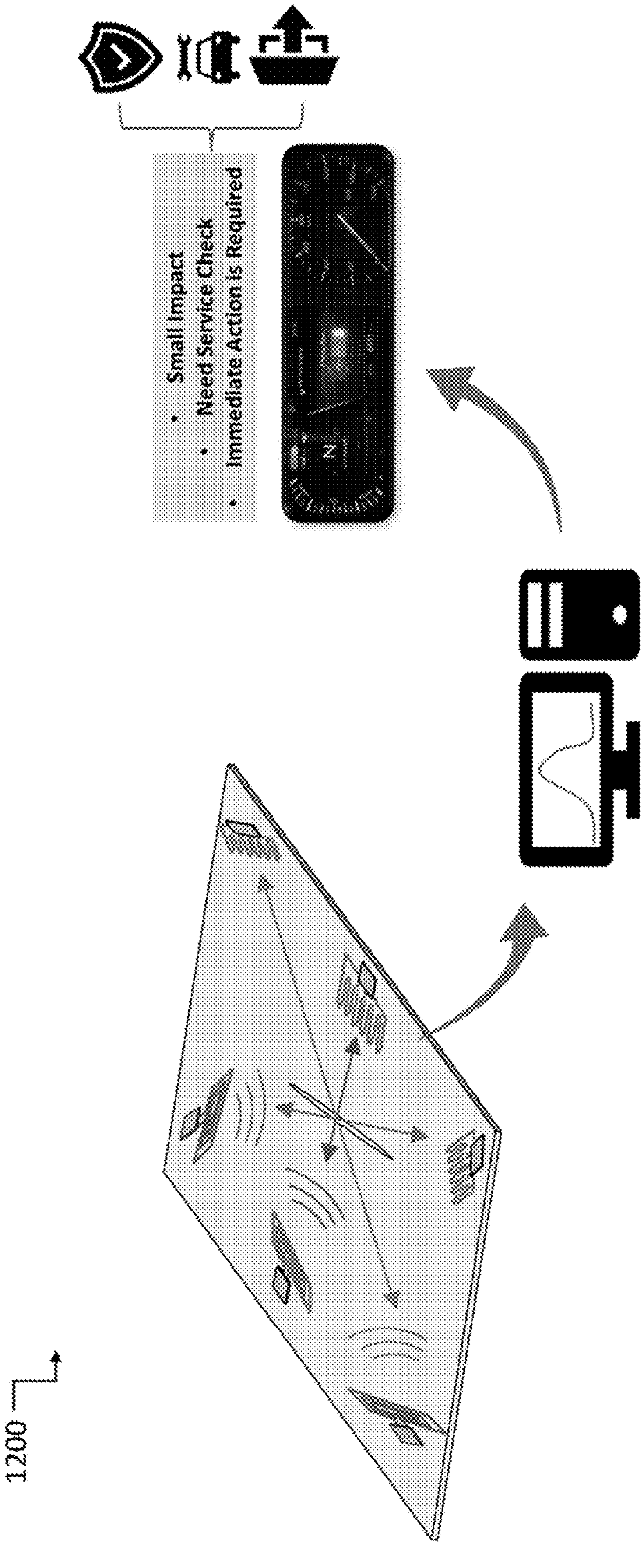
FIG. 15 is a schematic representation of the detection, analysis, and alert of a deformation in a composite laminate in accordance with the disclosed subject matter.

Referring now to FIG. 15, system 1200 includes an alert system configured to analyze the at least one wave datum. The alert system may include any of the data manipulation and analysis of the at least one wave datum. The alert system may be a component of the data acquisition system or vice versa. The alert system may be a separate system electrically coupled to the data acquisition system and the radio frequency wave transmitter and receiver, or plurality thereof. The alert system, whether performing the analysis itself, or receiving processed data from the data acquisition system generates an alert based on the at least a wave datum (e.g. wave data exceeds a predetermined maximum/minimum for that sensor or location on composite product).

The alert may include a text, call, email, push notification, alarm sound, chime, haptic feedback like a vibration, or other perceivable notification to a smartphone, tablet, laptop or a computer. The alert may include a call to emergency services such as 911, hospitals, doctors, paramedics, police, military, or the like. The alert may include one or more notifications to a driver of the vehicle on which the composite laminate is disposed, such as a body panel of a car. The driver may be notified by a dashboard light, sound, audio or visual cue, haptic cue, or a combination thereof. One or more system described herein may include one or more machine learning modules configured to analyze data and learn from training data sets to predict deformations at a higher fidelity over time. One or more systems herein such as alert system may include a suggested action for a driver, first responder, user, or another person to which the alert is transmitted regarding the damage and/or moisture detected. By implementing multiple coupled transmitter/receiver systems, the location and orientation of discontinuity can be determined. Based on the data collected from the damage detection system, controller unit analyze the size, type and location of damage. Machine learning based analyzer will determine the severity of damage and recommend the user what should be done.

Pultrusion Embedded Sensors

Figure 16:
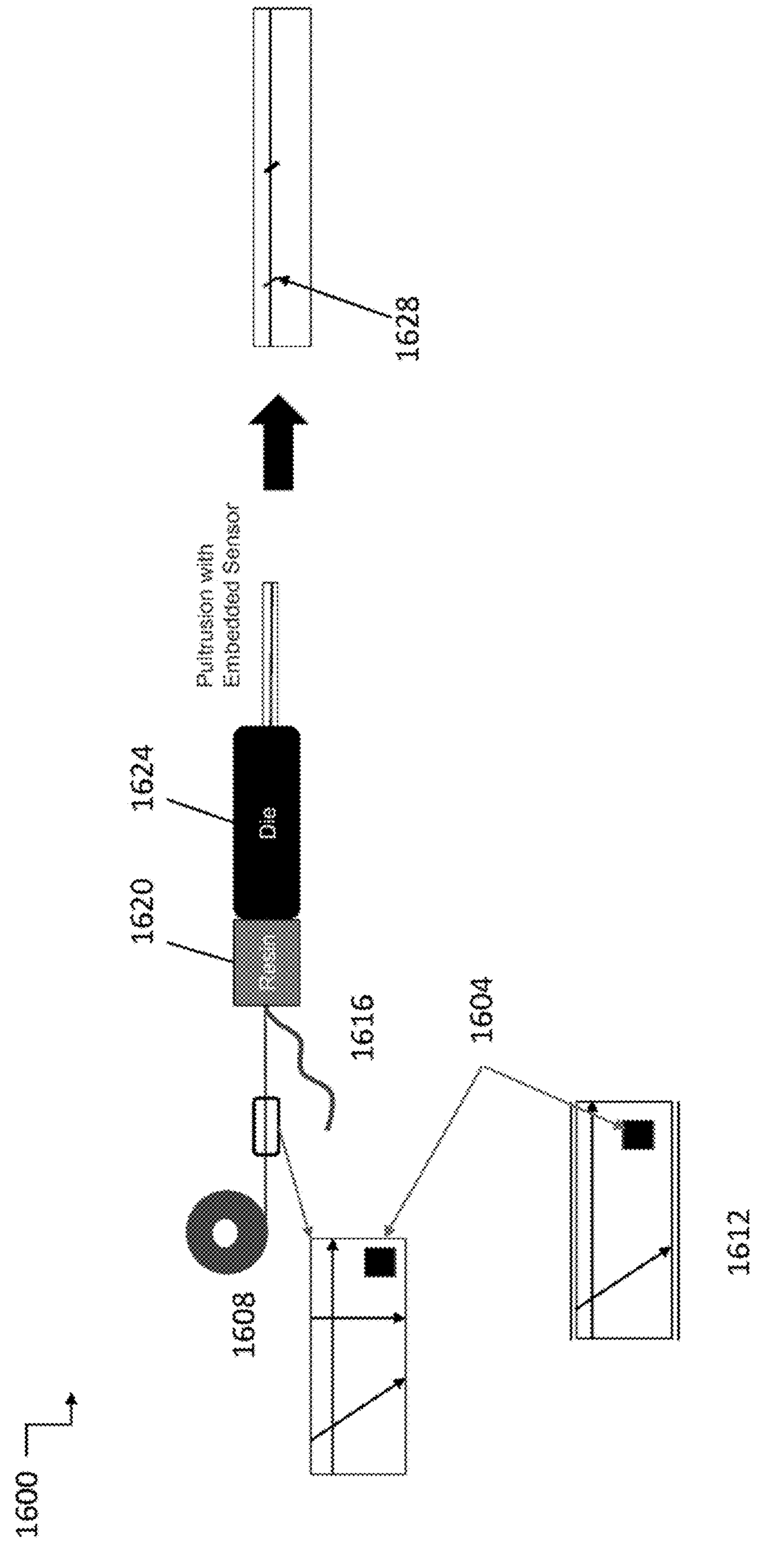
FIG. 16 is a schematic representation of the system and method for embedding sensors in a pultrusion in accordance with the disclosed subject matter.
Figure 17:
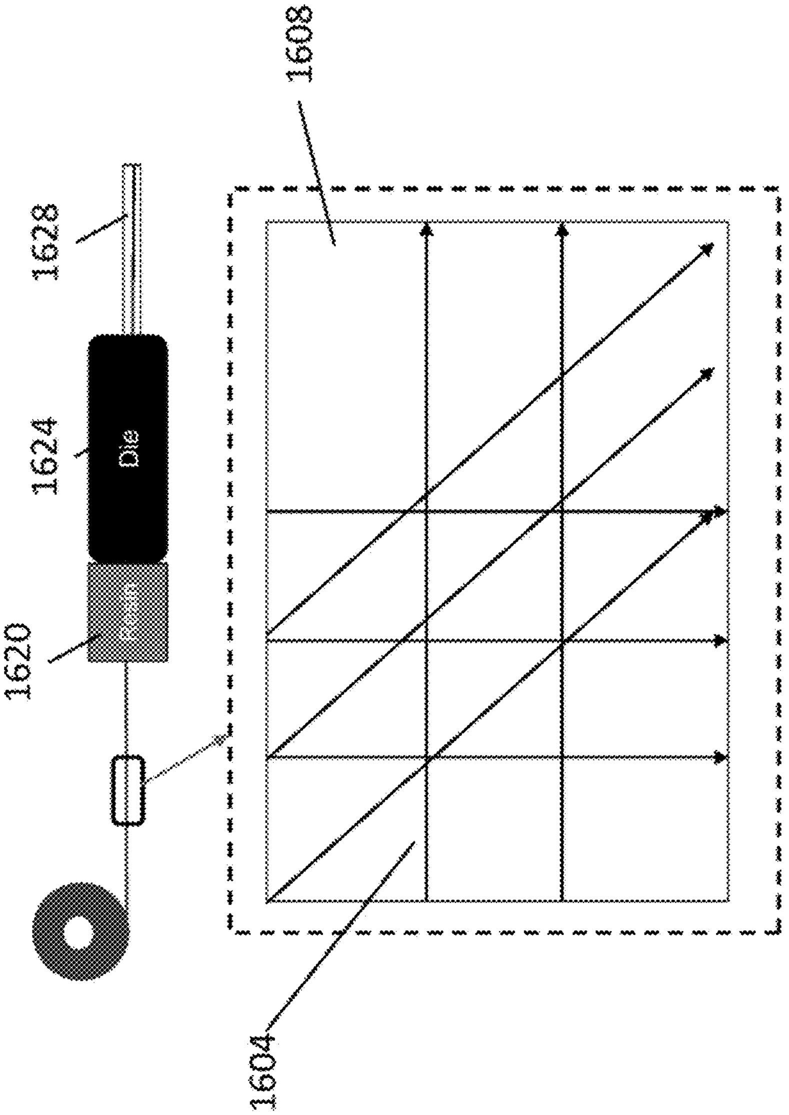
FIG. 17 is schematic representation of the system and method for embedding sensors in a pultrusion.

Referring now to FIG. 16, a system 1600 for embedding sensors 1604 in a pultrusion is represented in schematic form. The system 1600 may include a spool having fibers wrapped thereon, the fabric to be used in a composite laminate such as composite structural panel 104. The fabric/fiber may be one suitable for and applicable in fabric stitching to molding operations such as resin-transfer molding, VARTM and/or compression molding. The fabric may include at least a sensor 1604 within its strands, as shown in FIG. 17. The fabric may include one or more sensors 1604 may be RFID sensors as described herein. The fabric may be any sensors 1604 as described herein. The fabric may include a core material 1612 that has one or more sensors 1604 of varying typologies embedded within it. The fabric 1604 may include a sensor 1604 at regular intervals along its unspooled length. An embodiment of this solution is to bring the sensor 1604 into the part via a core material or other insert within the pultrusion (e.g., thermoset, thermoplastic or metallic prefabricated components or end-caps).

Referring now to FIG. 16, system 1600 may include a spool with an electrically conductive sensor filament 1616 alongside the fabric. This embodiment of the system 1600 includes one or more sensors 1604 from a reel directly into the pultrusion. This may be done from a single spool, from a sensor 1604 embedded in a fiber bundle, with a sensor embedded in a core material 1612, or in an end cap type material. The sensor 1604 may be one or more sensors working in tandem to measure one or more parameters such as electrical or physical parameters. A modification could be applicable in various filament 1616 or connectable sensor types such as fiber optics, embedded circuits, etc. A second embodiment of this solution is to attach the sensor 1604 to a woven, stitched or braided fibers. This may be done in process at the supplier or may be connected in-line. The sensor 1604 may include a mesh sensor. The sensor 1604 include a temperature sensor. The sensor 1604 is continuously pulled alongside the fiber 1616, 1608. The sensor 1604 may include a plurality of sensors disposed through the layers of the fiber. The sensor 1604 may include a thin, linear shape like a wire. The sensor 1604 may include a bundle of wires, braided wires, or some arrangement of wires. The sensor 1604 may include a connector end that is disposed outside of the fabric after the process for embedding the sensor is complete for connection to a system such as a data acquisition (DAQ) system. Said sensor end is identified and picked up post-process and connected to the DAQ system.

The system may include a resin container 1620 configured with at least one opening for the fabric 1616 and the sensor filament 1616 to be at least partially pulled through. Pulling the fabric 1608 and the sensor filament through the resin container 1620 may include partially immersing the fabric 1608 and the sensor filament 1616 through the liquid resin. Pulling the fabric 1608 and the sensor filament 1616 through the resin container 1620 may include totally immersing the fabric and sensor filament in the resin. The resin may coat the fabric 1608 and the sensor filament 1612. The resin may coat a portion of the fabric 1608 and the sensor filament 1616. The resin may soak through the fibers of the fabric and the sensor filament. The resin may be held in a resin container, the fabric or filaments pulled therethrough. The resin may alternatively or additionally be sprayed, poured, injected or otherwise imparted to the fabric according to this method.

The method for embedding sensors 1604 in a pultrusion may include pulling the resin-soaked fabric 1608 and sensor filament 1616 through a die 1624, wherein the die 1624 imparts a cross sectional shape and applies heat to the fabric 1608 and the sensor filament 1616. The die 1624 may apply pressure to the fabric 1608 and the sensor filament 1616 to bond the sensor filament onto the fabric. The die 1624 may apply pressure to the fabric 1608 and the sensor filament 1616 so that sensor 1604 disposed at the core of the fabric is disposed at a certain depth of the fabric. Sensor filament 1616 can extend throughout the entirety of the composite product, or only select portions thereof. As shown, the electrically conductive material 1616 can be oriented at varying angles, e.g. horizontally, vertically, diagonally, with a plurality of strands 1616 intersecting as select locations (as shown in FIG. 17).

Fabrication of Composite Electrical Circuits and Conductive Surfaces

Figure 18:
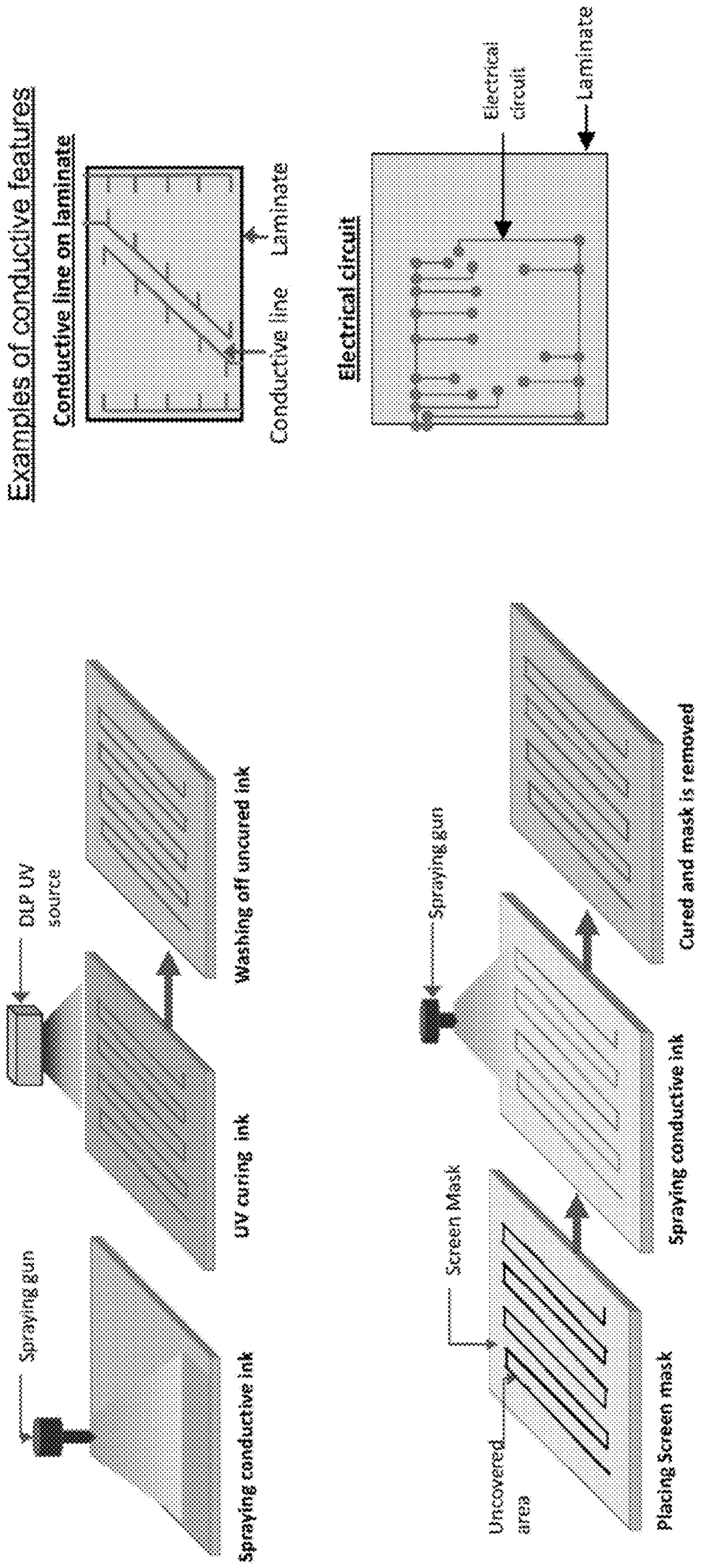
FIG. 18 is a schematic representation of various embodiments of fabricating an integral electric circuit and conductive contact surface on a composite laminate structure in accordance with the disclosed subject matter.

As shown in FIG. 18, the method 1800 for fabrication of integrated electric circuits on a composite laminate structure includes designing a conductive path to be fabricated on a composite laminate structure. The conductive path may include a conductive material disposed on at least a portion of a composite laminate structure such as in an electric circuit including terminals, attachment points for electronic components and/or leads for connection to one or more electric circuits. Selective coating with conductive material to produce an electrical connection between jointed parts may be at the joining of components, or areas adjacent to the joining portion.

This can be done by dispensing/spraying a conductive ink under pressure onto a composite substrate, applying a mask to impart the desired pattern, and exposing the substrate and ink to a curing (e.g. Ultraviolet light) operation, followed by cleaning of the finished product. Alternatively, a mask can first be applied over the composite substrate, and thereafter a conductive ink is sprayed-adhering in the desired pattern defined by the mask.

Figure 19:
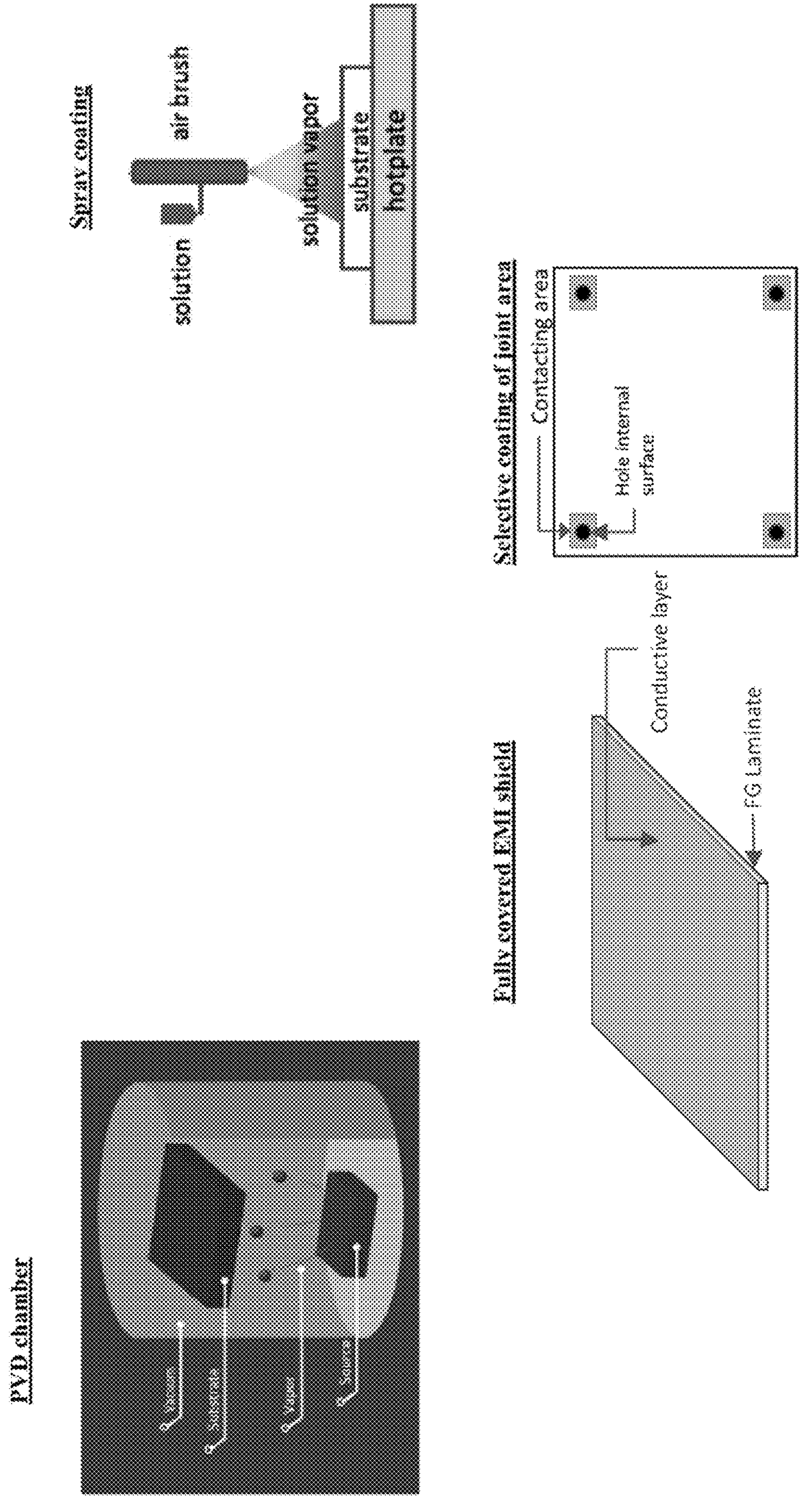
FIG. 19 is a schematic view of various embodiments of methods of fabricating an integral electric circuit and conductive contact surface on a composite laminate structure in accordance with the disclosed subject matter.

In an embodiment, shown in FIG. 19, an entire face of the composite laminate structure in conduct material for induction of charge between components utilizing electroplating, vapor deposition, or the like. The conductive material may include metallic materials and/or their alloys. The portion of the composite laminate structure wherein the conductive material is disposed include where structures join other components, around holes and or internal hole surfaces, or a combination thereof, such as in FIG. 19. In, FIG. 20 for example, there is conductive ink disposed around holes, slots, internal to the holes and slots such as in (a), along a connection area such as in (b). The holes/slots can extend throughout the entire thickness of the composite laminate. The conductive material may, in whole or in part, provide shielding from electromagnetic interference and/or radio frequency interference.

With continued reference to FIG. 18, method 1800 includes spraying a conductive ink on the composite laminate surface, wherein the conductive ink comprises conductive particles suspended with the conductive ink. The conductive ink may include a conductive solution in which the conductive particles are suspended. The conductive ink may include a plurality of viscosities. The conductive ink may be oil based. The conductive ink may be water based. The conductive ink may be the consistency of gel or paste. The conductive ink may be configured to not run when sprayed on and yet uncured.

With continued reference to FIG. 18, method 1800 includes curing a portion of the conductive ink by exposing it to an ultraviolet light source as a function of the conductive path. The UV light may be produced with a lamp or plurality thereof. The UV light may be precision pointed such that the conductive path that is cured includes the width of the beam of UV light. The UV light may be shone on the entire sprayed composite laminate structure and the cure occurs only where the spray was located. The UV light may move along the conductive path. The UV light may shine light in pulses, patterns, or continuously, according to embodiments.

With continued reference to FIG. 18, method 1800 includes washing an uncured portion of the conductive ink from the composite laminate structure. The uncured ink may be disposed on any area the UV light was not shone. The uncured ink may be disposed on a portion of the composite laminate structure wherein the UV light was not shone long enough or in the appropriate pattern/period/pulse, according to embodiments.

With continued reference to FIG. 18, method 1800 for fabrication of integrated electric circuits on a composite laminate structure includes covering a portion of a composite laminate structure with a screen mask, wherein the screen mask includes a cut out portion comprising the shape of a conductive path.

Figure 20:
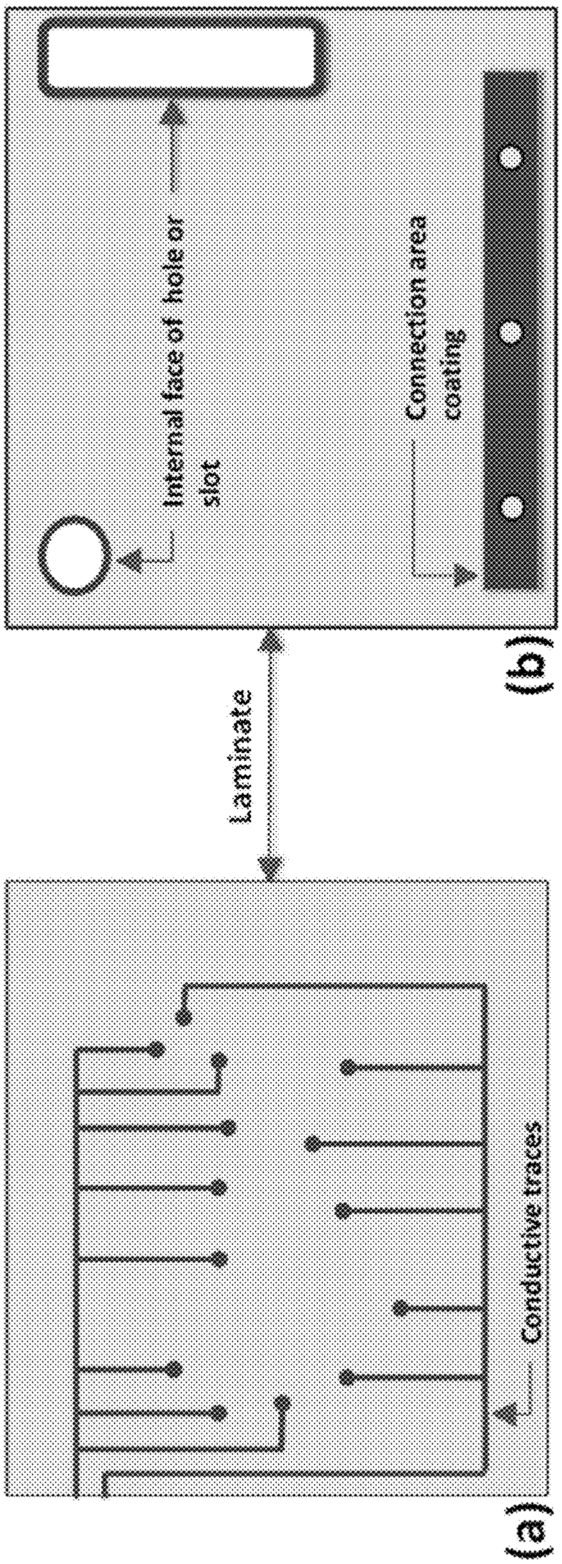
FIG. 20 is a schematic diagram of (a) electrical circuit and (b) connection joint area coated with conductive ink.

With continued reference to FIGS. 18-20, method 1800 includes spraying a conductive ink on the composite laminate surface and the screen mask, wherein the screen mask allows the conductive ink to pass through to the composite laminate structure in the shape of the conductive path. Industrial level high precision conductive features (different shaped or full surface cover) fabrication technique on the surface of composite laminate using, vapor deposition, screen printing, spray coating, DLP based UV source, conductive foil, or a combination thereof, or another method.

With continued reference to FIG. 18, method 1800 includes curing a portion of the conductive ink on the composite laminate structure by exposing it to ultraviolet light. With continued reference to FIG. 18, method 1800 includes removing the screen mask from the composite laminate structure.

Electroluminescence

As discussed above in reference FIG. 1, system 100 includes ELP 124. ELP 124 may be formed from a plurality of layers. ELP 124 may be formed as a portion of composite structural panel 104. ELP 124 may be formed as the entire composite panel 104.

ELP 124 may include one or more components or layers with an electroluminescent coating of a composite structure includes a transparent conductive layer 2104 configured to absorb light (e.g. ultraviolet UV wavelengths). The transparent conductive layer 2104 includes Indium oxide material in embodiments. One or more layers as described herein, especially the conductive transparent 2104 layer may provide abrasion, corrosion and UV resistance for cladding or coating systems.

Figure 21:
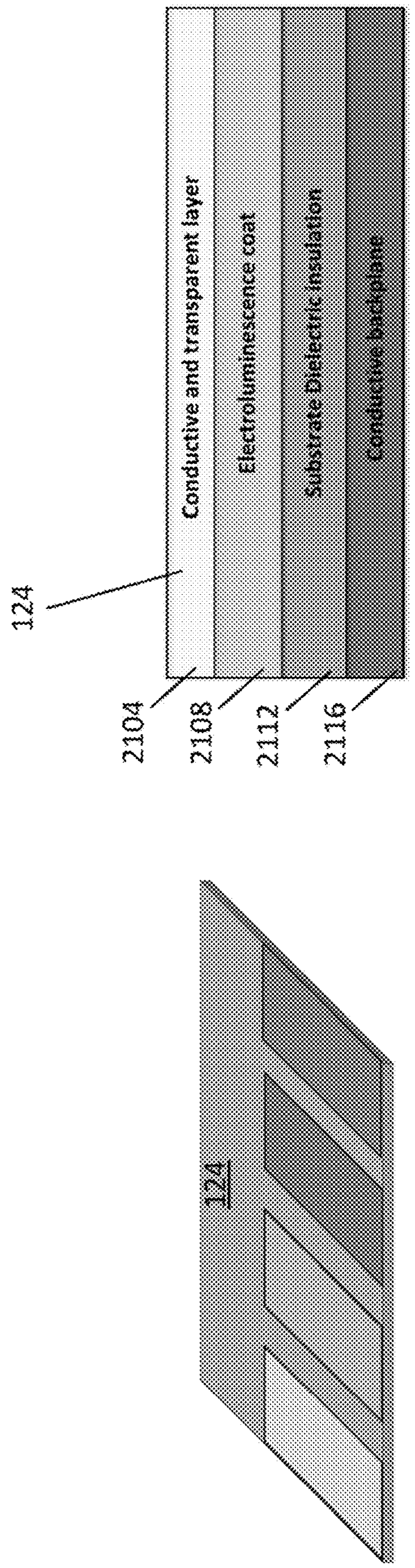
FIG. 21 is a schematic representation of the system for electroluminescent coating shown in cross sectional and perspective view in accordance with the disclosed subject matter.

ELP 124 may include an electroluminescent coat 2108 disposed underneath the transparent conductive layer. The electroluminescent coat 2108 includes a phosphorous-based electrochromatic coating configured to glow when an electric current is applied, in embodiments. According to the disclosed subject matter, multiple electroluminescence coat 2108 layers can be added to emit various color mixes according to the electric current applied thereto as shown in FIG. 21. In embodiments, the controlled activation of the luminescent coat 2108 for signaling, communication and markings may be accomplished using preprogrammed electric signals, a user input, a combination thereof, or a another method of illuminating the electroluminescent coat.

Figure 22:
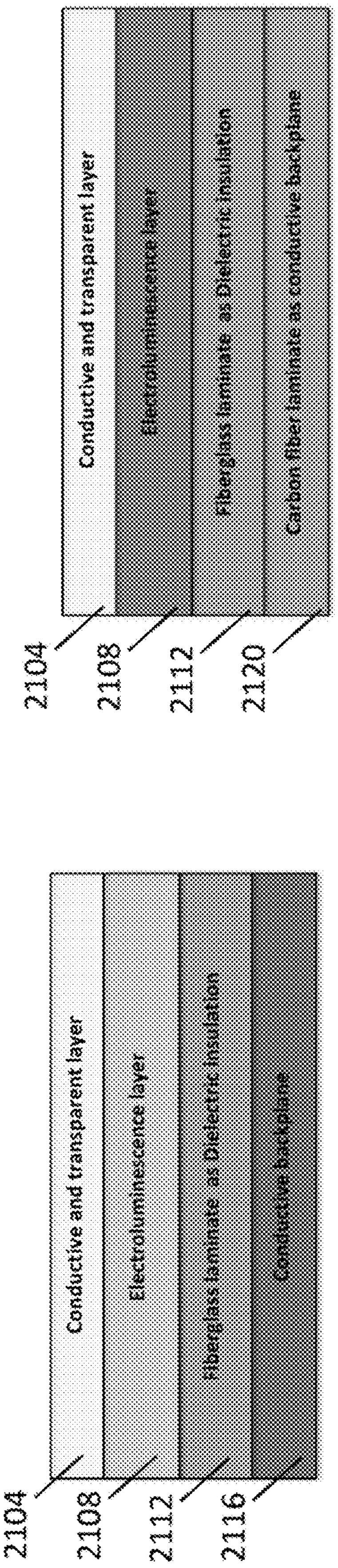
FIG. 22 is a cross sectional view of the system for electroluminescent coating in various embodiments as shown in FIG. 21.

With continued reference to FIG. 21, ELP 124 includes a substrate dielectric insulation 2112 disposed underneath the electroluminescent coat 2108. According to embodiments the substrate dielectric insulation 2112 may include a fiber glass laminate such as in FIG. 22. In various embodiments, ELP 124 may include substrate dielectric insulation formed from fiber glass laminate, carbon fiber laminate, or a combination thereof.

With continued reference to FIG. 21, ELP 124 includes a conductive backplane 2116 disposed underneath the substrate dielectric insulation 2112. According to embodiments, the conductive backplane layer 2116 may include a carbon fiber laminate such as in FIG. 22. According to embodiments, the substrate dielectric insulation 2112 may include fiber glass laminate and the conductive backplane may include carbon fiber laminate 2120 such as in FIG. 22.

Figure 23:
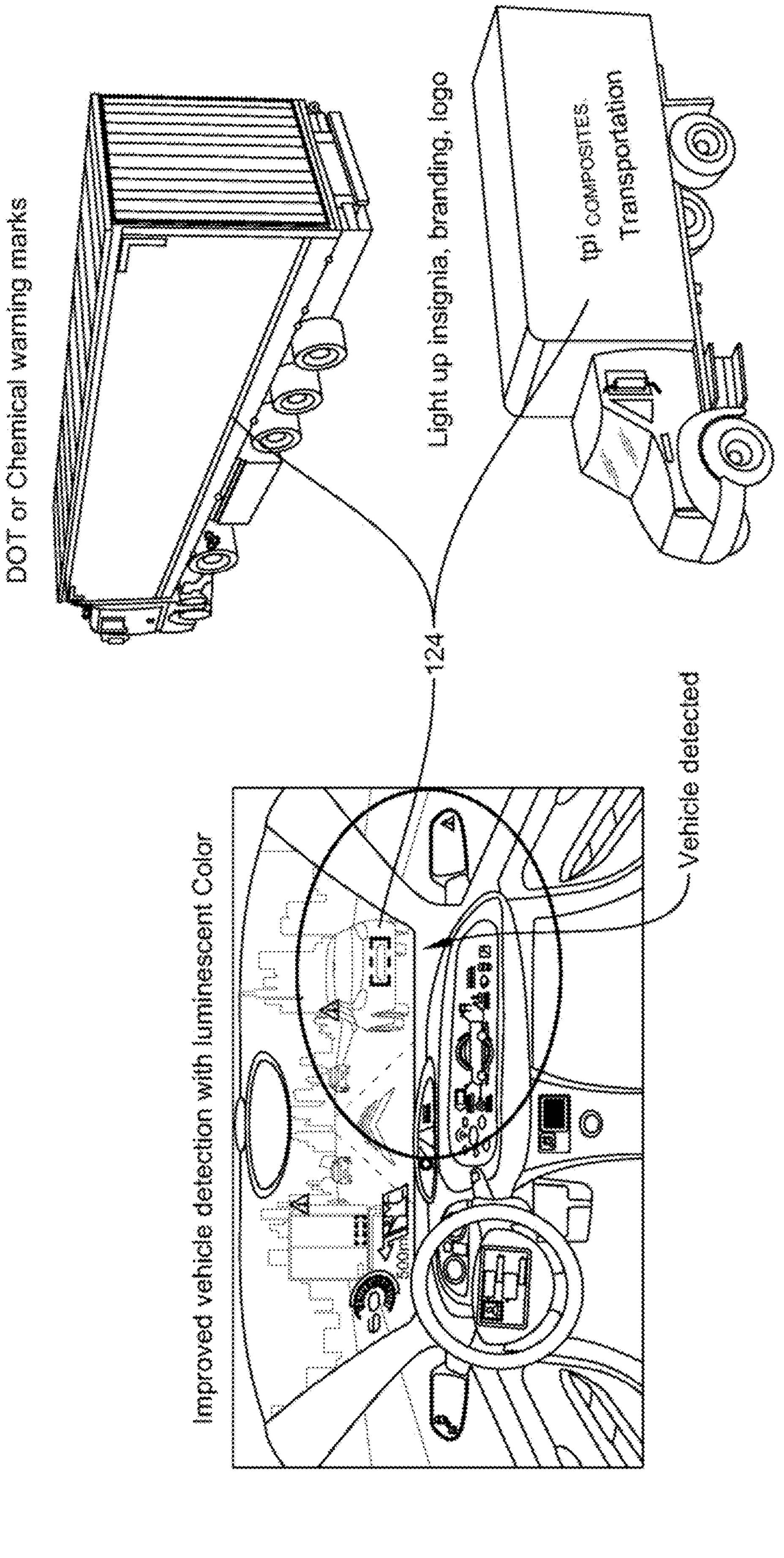
FIG. 23 is a perspective view of a tractor trailer utilizing the system as described herein and a driver's view out of a windshield of a car at other cars in traffic utilizing the system as described herein.

Referring now to FIG. 23, a perspective view of a tractor trailer utilizing the system as described herein and a driver's view out of a windshield of a car at other cars in traffic utilizing the system as described herein is shown. The coating system that also enhance electromagnetic interference, electromagnetic compatibility, radio frequency interference (EMI, EMC, RFI, respectively) shielding characteristics. The EMI/EMC/RFI shielding may be used to protect electronic systems behind the electroluminescent system, or the electroluminescent system itself. The system 2100 as described herein may enhance Vehicle to Vehicle, Vehicle to Human, and Vehicle to Internet Communication for autonomous driving for visible, infrared (IR), radar, and Light Detection and Ranging (LiDAR), e.g., UV light or turquoise color emission. The system 2100 may include application to vehicles and/or architectural panels. Department of Transportation (DOT) required safety marking could be illuminated with the application of the system as described herein.

Figure 24:
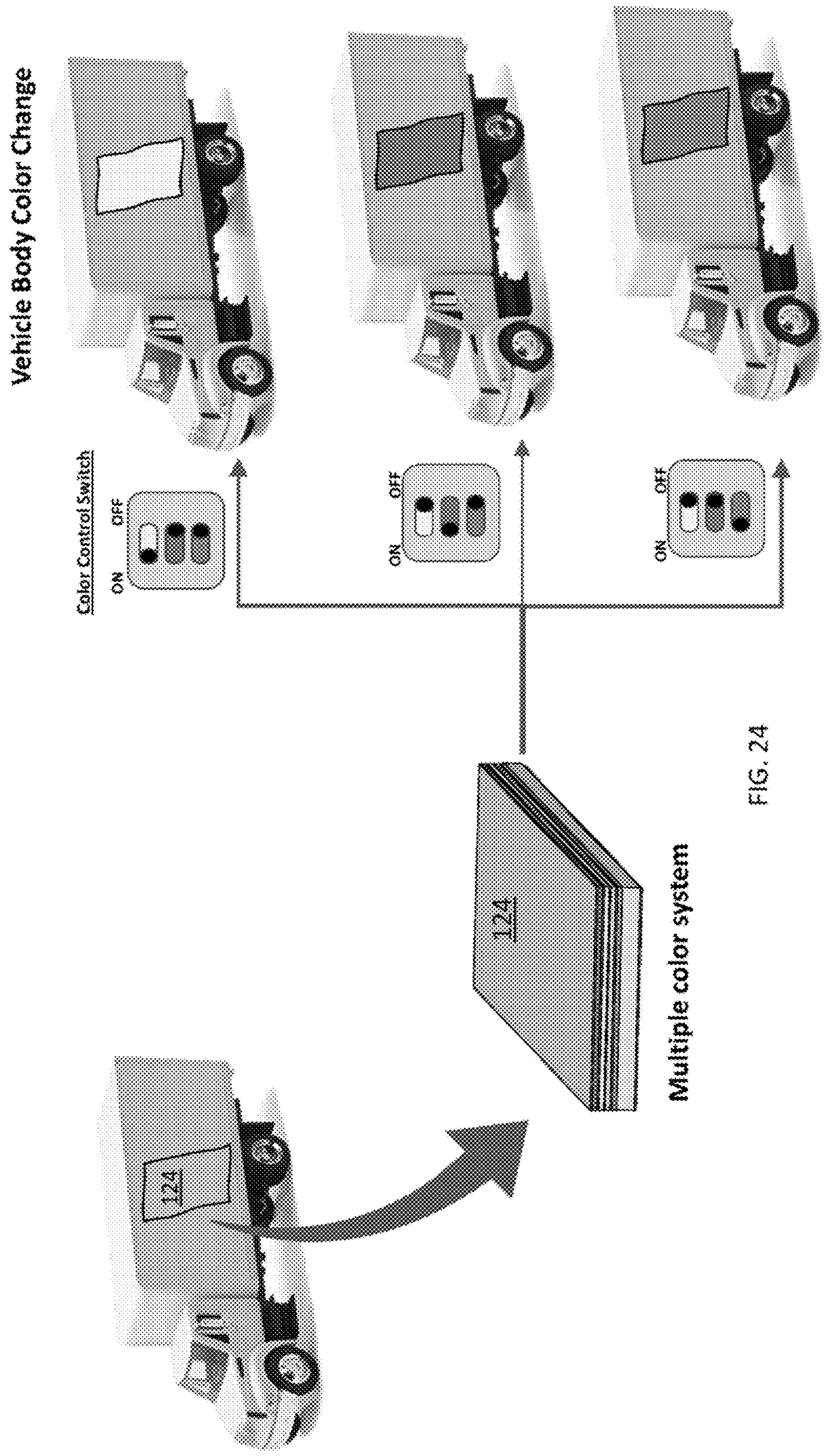
FIG. 24 is a cross sectional view of the layers of the system as described and various perspective views of the system disposed on the side of a box truck according to a color selection switch as described herein.

FIG. 24 is a cross sectional view of the layers of the ELP 124 as described and various perspective views of the system disposed on the side of a box truck according to a color selection switch. ELP 124 may be controlled utilizing one or more user interfaces such as a color switch. The switch may be one or more selectors including an on/off section and a color associated therewith. The switch may control the color of the glow of the electroluminescent layer of ELP 124 according to the selection and combination of colors. For example, if yellow and blue are selected to "on", then the system may glow green or shades thereof, according to intensity. The color switch may control intensity of each color, according to embodiments. ELP 124 may be manufactured using in-mold coating. According to embodiments, the ELP 124 or composite structural panel 104, in embodiments wherein the ELP 124 is the entire panel, may be formed in a mold, wherein the layers are laid in the mold integral to the composite. According to embodiments, the layer position, the amount of layers per type, and the arrangement thereof may vary according to applications and may alter the colors ELP 124 may glow. For example and without limitation, there could be more than one electroluminescent layer 2108 to produce a mixture of colors, intensity of light, and the like.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A system for structural health monitoring, the system comprising:

a composite structural panel;

at least one sensor embedded within the composite structural panel, the at least one sensor configured to detect a parameter associated with the composite structural panel;

an antenna in electrical communication with the at least one sensor, the antenna configured to transmit data associated with the parameter, the data comprising a radio-frequency signal; and a reader communicatively connected to the at least one sensor, the reader configured to receive the data;

wherein the antenna is formed from a printed conductive network and has a sinusoidal geometry, and wherein the antenna is configured such that a break in the antenna alters the radio-frequency signal, the alteration being indicative of the parameter; and wherein the at least one sensor comprises a resistor network having a plurality of resistors, the resistor network extending along a lateral direction and a longitudinal direction of the composite structural panel, wherein a deformation or a break of at least one resistor of the plurality of resistors alters a current flowing in the resistor network, the alteration in current being indicative of the parameter.

2. The system of claim 1, further comprising a processor, the processor communicatively connected to the reader and the processor configured to generate an action command corresponding to the data.

3. The system of claim 2, further comprising an electroluminescent panel communicatively connected to at least the processor.

4. The system of claim 2, further comprising at least one actuator switch, the at least one actuator switch communicatively connected to the processor, the at least one actuator switch configured to activate a thermal energy generator to deform a portion of the composite structural panel upon detection of damage thereto.

5. The system of claim 1, wherein the at least one sensor is an RFID sensor.

6. The system of claim 1, wherein the at least one sensor is wireless, and wherein the at least one sensor comprises a piezoelectric element configured to generate electricity in response to a deformation or a change in temperature and to provide power to the at least one sensor.

7. The system of claim 1, wherein the at least one sensor is embedded within the composite structural panel via a pultrusion process.

8. The system of claim 1, wherein the antenna is formed from conductive traces printed on the composite structural panel.

9. The system of claim 1, further comprising a flexible circuit, the flexible circuit having electrically conductive traces disposed on a substrate, the substrate having a plurality of perforations formed therethrough.

10. The system of claim 1, wherein the composite structural panel has an upper surface and a bottom surface defining a thickness therebetween, with the at least one sensor disposed within the composite structural panel at a location spaced from the upper and bottom surfaces.

11. The system of claim 1, further comprising a plurality of sensors configured to measure a parameter and generate a datum corresponding to the parameter;

a data acquisition system communicatively coupled to the plurality of sensors and configured to receive the datum; and an alert system electrically coupled to at least the data acquisition system and configured to generate an alert signal based on the datum.

* * * * *